(12) United States Patent
Nance

(10) Patent No.: US 8,180,504 B1
(45) Date of Patent: May 15, 2012

(54) AIRCRAFT LANDING GEAR COMPRESSION RATE MONITOR AND METHOD TO INCREASE AIRCRAFT LANDING WEIGHT LIMITATION

(76) Inventor: C. Kirk Nance, Keller, TX (US)

(*) Notice: Subject to any disclaimer, the term of this patent is extended or adjusted under 35 U.S.C. 154(b) by 545 days.

(21) Appl. No.: 12/469,976

(22) Filed: May 21, 2009

(51) Int. Cl.
*G05D 1/00* (2006.01)

(52) U.S. Cl. .......... 701/5; 701/3; 701/4; 701/16; 701/37

(58) Field of Classification Search .................. 701/3–5, 701/16, 37
See application file for complete search history.

(56) References Cited

U.S. PATENT DOCUMENTS

| | | |
|---|---|---|
| 2,587,628 A | 1/1952 | King |
| 3,517,550 A | 6/1970 | Leventhal |
| 3,712,122 A | 1/1973 | Harris et al. |
| 4,357,661 A | 11/1982 | Lambregts et al. |
| 4,979,154 A | 12/1990 | Brodeur |
| 5,214,586 A | 5/1993 | Nance |
| 5,260,702 A | 11/1993 | Thompson |
| 5,548,517 A * | 8/1996 | Nance .......................... 701/124 |
| 6,012,001 A | 1/2000 | Scully |
| 6,032,090 A * | 2/2000 | von Bose ........................ 701/37 |
| 6,120,009 A * | 9/2000 | Gatehouse et al. ......... 267/64.11 |
| 6,128,951 A | 10/2000 | Nance |
| 6,193,190 B1 | 2/2001 | Nance |
| 6,237,406 B1 | 5/2001 | Nance |
| 6,237,407 B1 | 5/2001 | Nance |
| 6,293,141 B1 | 9/2001 | Nance |
| 7,193,530 B2 | 3/2007 | Nance |
| 7,274,309 B2 | 9/2007 | Nance |
| 7,274,310 B1 | 9/2007 | Nance |
| 7,356,483 B2 | 4/2008 | Shirley et al. |
| 8,042,765 B1 * | 10/2011 | Nance ....................... 244/100 R |
| 8,055,396 B2 * | 11/2011 | Yates et al. ...................... 701/16 |
| 2007/0265739 A1 * | 11/2007 | Griffith ............................. 701/3 |

* cited by examiner

*Primary Examiner* — Hussein A. Elchanti
(74) *Attorney, Agent, or Firm* — Geoffrey A. Mantooth

(57) ABSTRACT

A system for use in monitoring, measuring, computing and displaying the rate of compression of aircraft landing gear struts, experienced while aircraft are executing either normal or hard landing events. Further by measuring the vertical compression rate of the landing gear strut, thus with aircraft hull angle correction to horizontal, determining the vertical sink-rate of the aircraft, as it comes into initial contact with the ground. Accelerometers are attached to opposing sides of a compressible landing gear strut, monitoring and measuring parallel data streams; then identifying differential acceleration data streams, which computed through mathematical algorithms measure the collapse rate of the landing gear strut. Pressure sensors are attached to the working pressure within the landing gear strut, so to monitor in-flight landing gear strut pre-charge pressure, until such time as the pre-charge pressure suddenly increases, to detect the aircraft has come into initial contact with the ground. A method of operating an aircraft at an increased maximum landing weight limitation.

22 Claims, 13 Drawing Sheets

| Table 2. Comparison of Landing Parameters by Aircraft Model, CVG Survey | | | | | | |
|---|---|---|---|---|---|---|
| | | Parameters | | | | |
| Aircraft Model | | Approach Speed (knots) | Closure Speed (knots) | Average Sink Speed (ft/sec) | Headwind (knots) | Crosswind (knots) |
| B-737 | Mean | 133 | 132 | 1.7 | 0.9 | -0.9 |
| | Std Dev | 8.33 | 8.39 | 0.85 | 1.96 | 1.42 |
| | Skewness | -0.033 | 0.060 | 1.678 | 0.069 | 0.241 |
| B-757 | Mean | 129 | 128 | 2.0 | 1.3 | -1.0 |
| | Std Dev | 5.30 | 5.98 | 0.97 | 1.77 | 1.83 |
| | Skewness | 0.497 | 0.199 | 1.624 | 0.591 | 0.118 |
| B-767 | Mean | 145 | 1.44 | 2.1 | 1.3 | -0.9 |
| | Std Dev | 4.58 | 5.4 | 1.05 | 2.00 | 2.02 |
| | Skewness | 0.238 | -0.718 | 0.286 | 0.764 | -0.277 |
| MD-90 | Mean | 141 | 141 | 2.2 | 0.4 | -0.1 |
| | Std Dev | 8.28 | 9.07 | 1.07 | 2.11 | 2.20 |
| | Skewness | 0.595 | 0.833 | 0.297 | 0.299 | -0.433 |
| Bombardier CRJ | Mean | 126 | 125 | 1.7 | 1.2 | -0.9 |
| | Std Dev | 13.87 | 13.96 | 0.836 | 1.60 | 2.17 |
| | Skewness | 0.059 | 0.029 | 0.815 | 0.627 | -0.020 |
| Dornier 328 Jet | Mean | 111 | 111 | 1.3 | 0.1 | -0.3 |
| | Std Dev | 16.33 | 16.07 | 0.57 | 1.20 | 2.33 |
| | Skewness | 0.796 | 0.783 | 0.398 | -1.105 | -0.308 |
| Embraer ERJ | Mean | 127 | 126 | 1.8 | 0.8 | -0.6 |
| | Std Dev | 12.56 | 11.76 | 0.729 | 1.80 | 2.93 |
| | Skewness | -0.823 | -0.987 | -0.288 | -1.528 | -1.047 |

FIG. 3

Kinetic Energy Equation: $\frac{1}{2} mass \times velocity^2$
for use in determining MLW increase for: EMB145 - XR

| | a | b | c | d | e | f | g | h | i | j | k | l |
|---|---|---|---|---|---|---|---|---|---|---|---|---|
| | MTOW | MLW | 1 main gear | 1/2 mass | velocity | V squared | Kinetic Energy at 10 fps | per gear weight increase | MLW increase | Kinetic Energy at 6 fps | Kinetic Energy at 2 fps | KE @ 2fps as % of KE @ 10 fps |
| 1 | 53,131 | 44,092 | 22,046 | 11,023 | 10.0 | 100 | 1,102,300 | - | - | 396,828 | 44,092 | 4.00% |
| 2 | 53,131 | 44,987 | 22,494 | 11,247 | 9.9 | 98.01 | 1,102,300 | 448 | 895 | 404,885 | 44,987 | 4.08% |
| 3 | 53,131 | 45,910 | 22,955 | 11,478 | 9.8 | 96.04 | 1,102,300 | 909 | 1,818 | 413,190 | 45,910 | 4.16% |
| 4 | 53,131 | 46,862 | 23,431 | 11,715 | 9.7 | 94.09 | 1,102,300 | 1,385 | 2,770 | 421,754 | 46,862 | 4.25% |
| 5 | 53,131 | 47,843 | 23,921 | 11,961 | 9.6 | 92.16 | 1,102,300 | 1,875 | 3,751 | 430,586 | 47,843 | 4.34% |
| 6 | 53,131 | 48,855 | 24,428 | 12,214 | 9.5 | 90.25 | 1,102,300 | 2,382 | 4,763 | 439,699 | 48,855 | 4.43% |
| | Column "a" is the maximum take-off weight, at which the aircraft was originally certified | Column "b" is the proposed maximum landing weight, associated with reduced touch-down velocity | Column "c" is the amount of maximum landing weight experienced by 1 main gear | Column "d" is 1/2 of the maximum landing weight experienced by 1 main gear | Column "e" is the measured touch-down vertical velocity of the aircraft, as it comes into initial contact with the runway | Column "f" is the touch-down vertical velocity of the aircraft, squared | Column "g" is the Kinetic Energy limitation associated with the structural design of the aircraft, at a descent velocity of 10.0 fps | Column "h" is the amount of total maximum landing weight increase, associated with a reduced vertical touch-down velocity | Column "i" is the amount of maximum landing weight increase, per each main landing gear | Column "j" is the reduced Kinetic Energy value associated with the higher landing weights, coming into contact with the runway, at vertical touch-down velocities reduced to 6 fps | Column "k" is the reduced Kinetic Energy value associated with the higher landing weights, coming into contact with the runway, at vertical touch-down velocities reduced to 2 fps | Column "l" is the percentage of KE at MLW landing at 2fps compared to the assumed 10fps |

FIG. 4

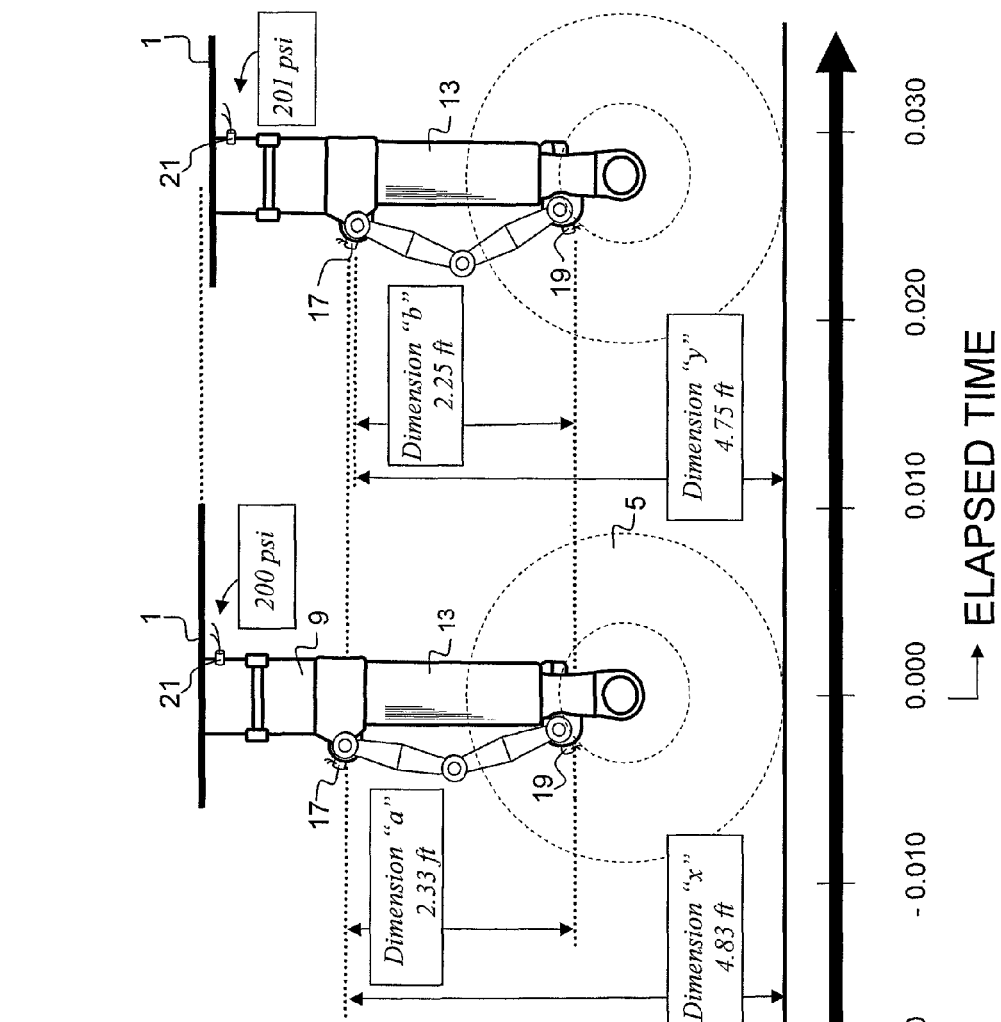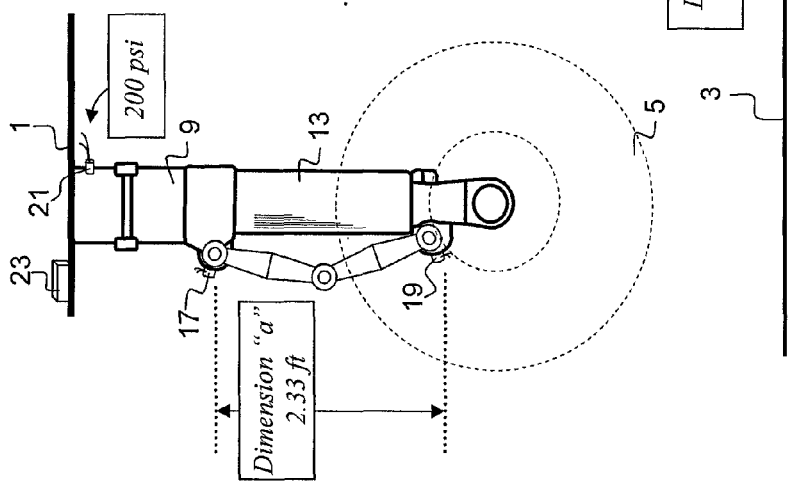

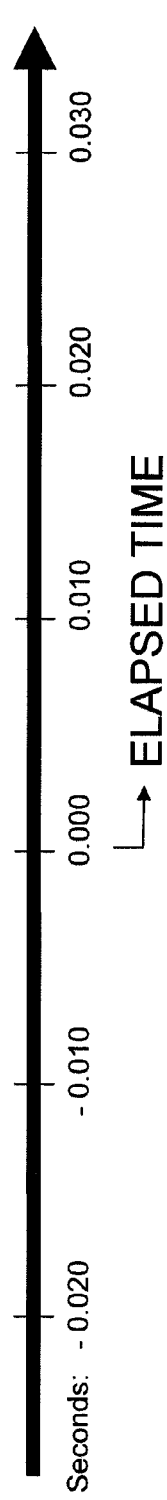

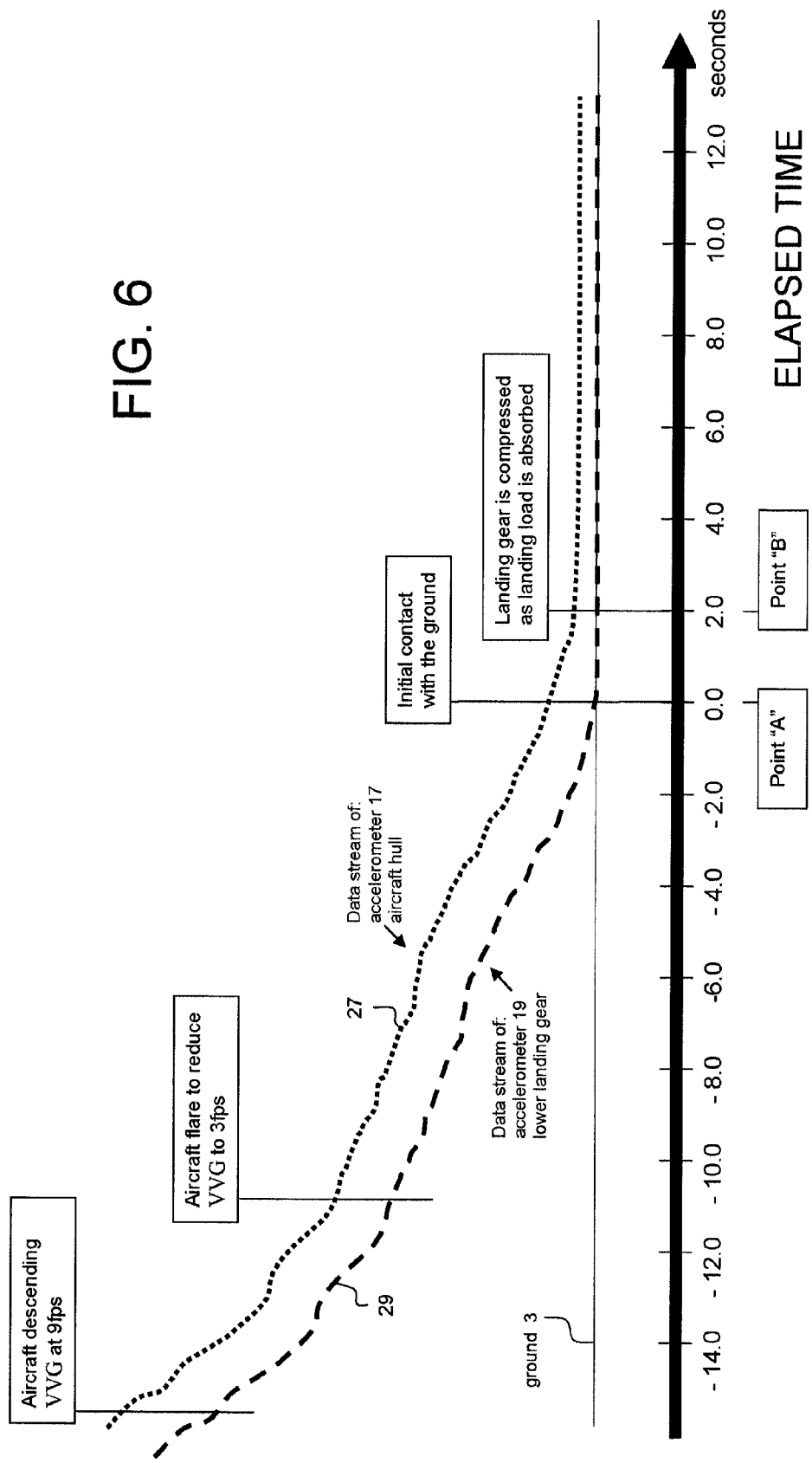

Software Program "Gamma"

Software Program "Delta"
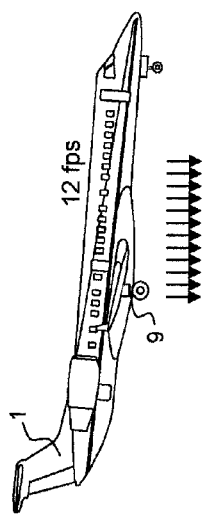
12 fps
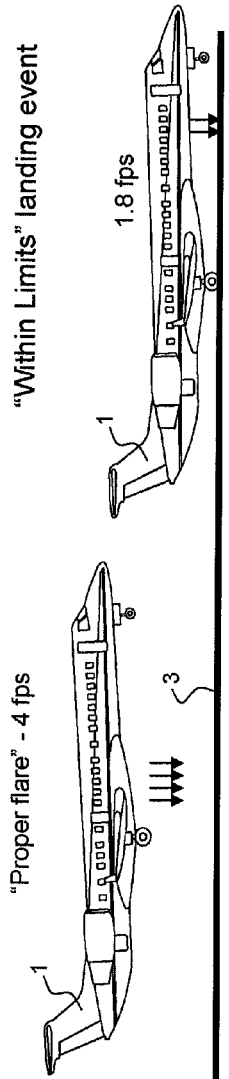
"Proper flare" – 4 fps
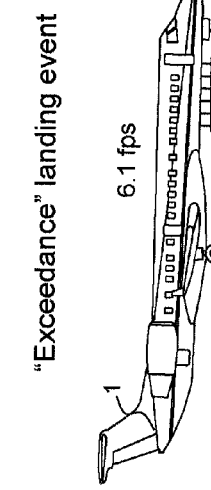
"Within Limits" landing event
1.8 fps
FIG. 8a
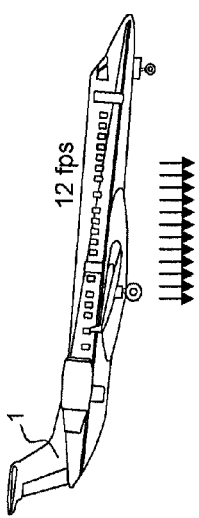
12 fps
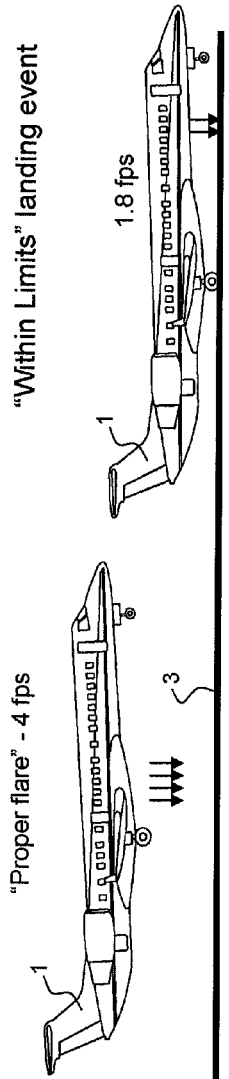
"Improper flare" – 8 fps
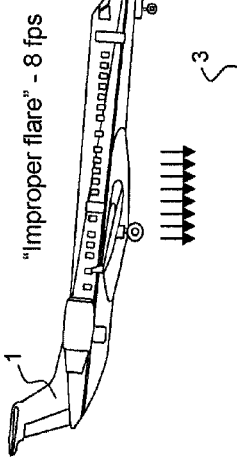
"Exceedance" landing event
6.1 fps
FIG. 8b

AIRCRAFT LANDING GEAR COMPRESSION RATE MONITOR AND METHOD TO INCREASE AIRCRAFT LANDING WEIGHT LIMITATION

BACKGROUND OF THE INVENTION

An aircraft is typically supported by plural pressurized landing gear struts. Designs of landing gear incorporate moving components which absorb the impact force of landing. Moving components of an aircraft landing gear shock absorber are commonly vertical telescopic elements. An alternate type of landing gear incorporates a trailing arm design which forms a triangle shape, where the main supporting body of the landing gear is hinged with a trailing arm, and a typical telescopic shock absorber functions as the third side of the triangle. The telescopic shock absorber of both types of landing gear comprise internal fluids, both hydraulic fluid and compressed nitrogen gas, and function to absorb the vertical descent forces generated when the aircraft lands.

Prior to a landing event, as the aircraft descends towards the runway, the landing gear is deployed. Each of the landing gear maintains an internal pre-charge pressure within the telescopic shock strut. The pre-charge pressure is a relatively low pressure, which is maintained to insure the landing gear shock absorber component is extended to full telescopic extension, prior to the aircraft landing. At full telescopic extension, the shock absorber can absorb its maximum amount of landing force. As the landing gear comes into initial contact with the ground, the strut begins to compress, thereby increasing the pressure within the shock absorber. Increases in pressure, beyond the pre-charge pressure, creates additional resistance to the compression rate of the landing gear strut, which helps reduce the vertical velocity of the aircraft.

The amount of force generated when an aircraft lands is a function of the aircraft weight at landing, and the vertical velocity at which that aircraft landing weight comes into initial contact with the ground. Aircraft have limitations regarding the maximum allowable force the aircraft landing gear and other supporting structures of the aircraft can safely absorb when the aircraft lands. Landing force limitations, which are often related to aircraft vertical velocity (sink-rate or sink-speed) at initial contact with the ground, are a key factor in determining the Maximum Landing Weight ("MLW") for aircraft. The MLW limitation is related to an assumed aircraft Vertical Velocity at initial contact with the Ground ("hereinafter referred to as: VVG").

Aircraft routinely depart from an airport with the aircraft weight less than the maximum take-off weight limitation, but greater than the maximum landing weight limitation. During the flight, in-route fuel is burned to reduce the aircraft weight, below the maximum landing weight limitation. On average, passenger airlines dispatch about 28,537 flights per day. With this high volume of daily flights, situations often arise where an aircraft has left the departure airport, and the pilot discovers the need to immediately return and land, without the time or opportunity to burn-off the planned in-route fuel. This causes an overweight landing event. When an overweight landing occurs, the Federal Aviation Administration (hereinafter referred to as "FAA") in accordance with the aircraft manufacturer recommendations, require the aircraft be removed from service and a manual inspection be performed to check for damage of the landing gear and the connection fittings of the landing gear to the aircraft.

Because an overweight landing causes the aircraft to be removed from service for inspection, airlines work to avoid such events. As a result, an aircraft may take off with un-used capacity, because its take-off weight is less than the take-off weight limit. The weight carrying ability of the aircraft is thus limited, not by the maximum take-off weight limitation, but by the landing weight limitation.

The landing weight is limited by FAA Regulation. In studying the regulation and its history, an important realization was made.

The FAA is the Regulatory Authority which regulates the design, development, manufacture, modification and operation of all aircraft operated within the United States, and will be used along with the term "Regulatory Authority" to indicate both the FAA and/or any governmental organization (or designated entity) charged with the responsibility for either initial certification of aircraft or modifications to the certification. Examples of Regulatory Authorities would include: European Aviation Safety Agency "EASA", within most European countries; Transport Canada, Civil Aviation Directorate "TCCA", in Canada; Agencia Nacional de Aviayao Civil "ANAC" in Brazil; or other such respective Regulatory Authority within other such respective country.

FAA Regulations (provided in the Code of Federal Regulations) are the governmental regulations which detail the requirements necessary for an aircraft to receive certification by the Regulatory Authority within the United States. These would be equivalent to such regulations within the Joint Aviation Regulations "JARs" which are used in many European countries.

Title 14 of the Code of Federal Regulations, Part 25 refers to regulations which control the certification of Air Transport Category aircraft "Part 25 aircraft". Part 25 aircraft include most of the commercial passenger aircraft in use today. For example, Part 25 aircraft includes Boeing model numbers 737, 747, 757, 767, 777; Airbus A300, A310, A320, A330, A340, etc.

In particular §25.473(a) provides:
Title 14—Code of Federal Regulations:
Part 25—Airworthiness Standards: Transport Category Airplanes
§25.473 Landing load conditions and assumptions.
(a) For the landing conditions specified in §25.479 to §25.485 the airplane is assumed to contact the ground—
(1) In the attitudes defined in §25.479 and §25.481;
(2) With a limit descent velocity of 10 fps at the design landing weight (the maximum weight for landing conditions at maximum descent velocity); and
(3) With a limit descent velocity of 6 fps at the design take-off weight (the maximum weight for landing conditions at a reduced descent velocity).
(4) The prescribed descent velocities may be modified if it is shown that the airplane has design features that make it impossible to develop these velocities.
(emphasis provided: as to the underlined text)

Values described in the regulation and also herein, as they relate to vertical landing velocity, are expressed in feet per second "fps" and while these are typical values, they are used herein for example purposes only and are not limiting or restricting to the processes and methods described.

Chapter §25.473(a) of the FAA Regulations define the assumption as to the "limit descent velocity" which is the maximum VVG an aircraft is assumed to experience, during a landing event. This assumption is 10 feet per second "10 fps".

The current rule evolved in the early Civil Aeronautics Board—Civil Air Regulations, Part 4b, §4b.230 (b) dating back to Nov. 9, 1945. The full text is provided herein as reference material, but the relevant text is in the final two paragraphs (i) and (ii).

Civil Aeronautics Board Civial Air Regulations

Part 4b—Airplane Airworthiness Transport Catagories

§4b.230 General. The limit loads obtained in the conditions specified in §§4b.321 through 4b.236 shall be considered as external forces applied to the airplane structure and shall place in equilibrium by linear and angular inertia forces in a rational or conservative manner. In applying the specific conditions the provisions of paragraph (a) of this section shall be complied with. In addition, for landing conditions of §4b.321 through 4b.234 the airplane shall be assumed to be subject to forces and descent velocities prescribed in paragraph (b) of this section. (The basic landing gear dimensional data are given in FIG. 4b-7.)
(a) Center of gravity positions. The critical center of Gravity positions within the certification limits shall be selected so that the maximum design loads in each landing gear elements are obtained in the landing and ground handling conditions.
(b) Load factors, descent velocities and design weights for landing conditions. (1) In the landing conditions the limit vertical inertia load factors at the center of gravity of the airplane shall be chosen by the applicant, except that they shall not be less than the values which would be obtained when landing the airplane with the following limit descent velocities and weights:
  (i) 10 f.p.s. at the design landing weight.
  (ii) 6 f.p.s. at the design take-off weight.

Today an aircraft's MLW limitation is governed by these 64 year old regulatory assumptions, whereby an aircraft manufacturer must design and demonstrate the structural integrity of the aircraft and landing gear, to allow for the weight of that aircraft to land at MLW, with a VVG of 10 fps, with no damage to the aircraft.

Chapter §25.473 also requires demonstration of the aircraft can safely landed at reduced VVG rates, which are assumed not to exceed 6 fps, at the higher maximum takeoff weight "MTOW." This event is allowed only in emergency or non-scheduled events, and an over-weight landing inspection is required immediately after such over-weight landing event. Though current regulations for aircraft design criteria acknowledge aircraft structural integrity to allow the aircraft to land at a weight greater than the originally certified MLW for that aircraft, with there being no active and operational system to accurately measure the VVG of those higher landing weight aircraft, there have been no justifications for the aviation Regulatory Authorities to allow for planned or scheduled landing events at the higher weights.

The previous paragraphs have the words "assumption" and "assumed" underlined. The FAA Regulations for the design criteria of Part 25 aircraft have the VVG of an aircraft as an assumed value, not as a measured value. This is a very important consideration, in the reasoning of the methods and strategies of this invention. There were no systems to measure aircraft VVG in 1945. From then, until today, there has been no justification basis provided to the FAA to modify the 10 fps assumption. Various systems have been developed for use within the current scope of the 10 fps requirements, but used only to better identify the extreme landing loads near, and in excess of 10 fps, experienced during aircraft landing mishaps. These different systems are not being used as part of a combined apparatus and method to demonstrate a justification basis for the reduction of the aircraft limit descent velocity assumption, for determining a second higher aircraft MLW limitation.

When aircraft leave a manufacture's assembly facility, there are no assurances that all subsequent landing events will be soft or smooth. FAA Regulations historically take the approach of "plan for the worst and hope for the best", thus leaving the 10 fps assumption still in effect today.

FAA Regulations assume the aircraft is landing with each of the main landing gear simultaneously touching the ground and the landing force being equally distributed between the main landing gears. However, cross-wind landings are a common occurrence. In cross-wind situations, the pilot will adjust the lateral angle of the aircraft to lower the wing pointed in the direction of the cross-wind. Lowering this windward wing aides in stabilizing the aircraft against a sudden gust of stronger cross-wind; but also increases the possibility that the aircraft will have an asymmetrical landing gear touch-down. Currently there are no devices certified by the FAA and installed on aircraft to measure and monitor individual landing gear compression rates, nor the ability to confirm the landing gear initial contact with the ground.

One method to measure VVG is to use on-board accelerometers. The FAA requires a flight data recorder ("FDR") on transport category aircraft ("Part 25 aircraft") when carrying "revenue, or for hire" passengers. The FDR incorporates multi-axis accelerometers (located at the center of gravity of the aircraft hull) which measure various shock loads that become evident during an abrupt landing event. The accelerometer data is usually not available unless an accident has occurred, and the FDR is removed from the aircraft, the data downloaded, and then analyzed. Assuming one might attempt to determine landing gear compression rate from the FDR data, the information would be merely calculations from measurements taken not at the respective landing gear locations of the aircraft, but along the center-line of the aircraft. The FDR calculations would not be associated with the compression rate of any respective landing gear strut, but rather any changes in acceleration for the centerline of the aircraft hull as a whole.

As an example: an aircraft begins its initial descent from altitude and transitions from level flight to a descent rate equivalent to 12 fps, being an initial 1 g descent. After a period of time, continuing this constant 12 fps decent rate, the data from the accelerometer no longer indicate a positive or negative vertical acceleration, because though the aircraft is descending, the descent has been in a straight-line, downward angle, at a constant rate. As the aircraft maintains this 12 fps descent rate, and approaches the runway air-turbulence may buffet the aircraft in upward and downward directions. Various changes in g-force will be experienced by the aircraft accelerometers measuring these various positive and negative, vertical accelerations. Without a sophisticated computer, tracking all of the various changes in acceleration, up or down, throughout the final landing approach of the aircraft; the final acceleration measurement taken from the sudden "jolt" of the aircraft landing gear coming into initial contact with the ground may be distorted, and may not correlate to a precise VVG, equivalent to the aircraft landing event.

Further challenges faced with using FDR accelerometers to measure VVG include the ability to confirm and identify any change in aircraft vertical velocity at initial contact with the ground. The lack of such a system having an ability to identify that the aircraft has made initial contact with the ground will allow for false identification of aircraft vertical velocity at the exact moment of ground contact. If the aircraft has a high velocity of descent rate prior to touch-down and a proper flare procedure is not completed in a timely manner, a high rate of aircraft vertical acceleration may remain constant beyond the initial contact with the ground. Aircraft vertical acceleration at such a high value will over-power the "minimal pre-charge" pressure within each landing strut, as well as the initial increase in strut pressure will not be sufficient to reduce aircraft vertical acceleration until some time after initial contact with the ground. In such a case the monitoring of acceleration change will be after the initial contact with the ground and such change in acceleration with further calculation of aircraft vertical velocity at the exact moment of initial contact with the ground will be in error. The determination of vertical velocity at the exact moment of initial contact with the ground is a critical factor in efforts to convince the Regulatory Authorities in requests for modifications in current regulations regarding sink-rate assumptions and further to allow for increase in max-landing weight, as function of better determination of aircraft vertical velocity at initial contact with the ground.

One aspect of this invention offers an improvement to the prior art by using a unique accelerometer arrangement. A first accelerometer is located adjacent to and directly above each of the aircraft landing gear, along with a second accelerometer attached to the lower portion of each telescopic landing gear strut. Use of this "dual accelerometer" configuration, allows for the measurement of aircraft vertical acceleration in locations above and below the compressible area of the landing gear strut, which further allows for a more accurate determination of landing gear compression and rate of compression. The dual accelerometers will produce matching data streams until such time as the aircraft landing gear are either compressing or extending. The aircraft landing gear struts will compress as they come into initial contact with the ground. The difference in acceleration data streams, between the dual accelerometers, can then be used to accurately measure aircraft VVG, and accurately identify when the landing gear has made initial contact with the ground.

As a practical mater, obtaining accurate data on VVG, whether by the dual accelerometer arrangement discussed above (and discussed in more detail in the Description), or by some other arrangement, provides the possibility of seeking modification in the regulatory assumptions on descent velocity or VVG, which in turn would allow Part 25 aircraft to have higher maximum landing weights (MLW). Although the assumption of 10 fps in the design criteria of the existing regulations have been in effect for over 6 decades, recent data shows that the assumption provides a very large safety margin. The FAA William J. Hughes Technical Center (FAA's Research and Development Division, "FAA Tech Center") has made efforts to determine the rate of typical VVG landing events. Beginning in 1993 and running through 2008, the FAA Tech Center has completed multiple studies of aircraft landing parameters, including aircraft sink-speeds, at multiple airports located around the world, in efforts to accumulate more data regarding the landing events of daily airline operations. The FAA Tech Center survey data has been facilitated with the use of high-speed digital cameras, positioned at the "landing threshold zone" of the various airport runways and measure aircraft landing parameters for a large number of Part 25 aircraft. The most recent FAA Tech Center survey data, recorded during 2008, documents the "mean" or "average" VVG range, which is approximately 2 fps. (VVG, as in the Tech Center report is referred to as "Sink Speed").

{http://www.tc.faa.gov/its/worldpac/techrpt/ar04-47.pdf}

Findings of an Equivalent Level Of Safety, Special Condition or Exemption are used to describe various practices by which a Regulatory Authority provides relief from, or modification to, a regulatory requirement. This relief is normally granted by the Regulatory Authority, after demonstration and/or analysis of an alternate means of compliance, which verifies compliance with the intent of the regulation, without showing literal compliance to the regulation.

Another aspect of this invention is a method by which Part 25 aircraft are justified in receiving relief from the 10 fps assumption, to a lower assumption whereby the MLW of that Part 25 aircraft may be increased and acknowledged by aviation Regulatory Authorities. One of the methods of this invention involves analysis of the FAA Tech Center landing survey data, combined with development and implementation of new daily operational requirements for the Part 25 aircraft; thus providing by either: a demonstration or analysis to substantiate, a finding of an "Equivalent Level Of Safety" and/or "Special Condition".

The FAA defines and Equivalent Level Of Safety (ELOS) as follows:

"Equivalent level of safety findings are made when literal compliance with a certification regulation cannot be shown and compensating factors exist which can be shown to provide an equivalent level of safety."
{http://rgl.faa.gov/Regulatory_and_Guidance_Library/rgELOS.nsf/}

The FAA issues a finding of ELOS during the process of certification, whether that be the initial certification of an aircraft, certifications of derivative aircraft the manufacturer may develop or when issuing a Supplemental Type Certificate for modifications to an aircraft type, developed by entities other than the manufacturer.

In the case of the methods of this invention, a demonstration of "literal compliance" with the regulatory design assumption (10 fps) cannot be shown, however the "compensating factors" which exist to substantiate the ELOS finding include:

The incorporation of apparatus and methods to measure, record and display (or generate alerts) when defined VVG thresholds are exceeded and, one or more of the following additional elements:

The Approved Flight Manual for the aircraft contains specific VVG limits with which the aircraft must apply and provides for compliance with the traditional 10 fps limiting landing weight, if the VVG measuring system is inoperative;

Apparatus and methods for recording the VVG for all landings in support of a trend monitoring system to monitor the life "experience" of both the airframe and individual landing gear;

Alerting to the flight deck crew after a landing in which the VVG exceeds one or more pre-defined thresholds and supported by corresponding log book entry and/or inspection requirements.

The FAA defines Special Condition as follows:

"A Special Condition is a rulemaking action that is specific to an aircraft type and often concerns the use of new technology that the Code of Federal Regulations does not yet address. Special Conditions are an integral part of the Certification Basis and give the manufacturer permission to build the aircraft, engine or propeller with additional capabilities not referred to in the regulations."
{http://rgl.faa.gov/Regulatory_and_Guidance_Library/rgSC.nsf/}

A Regulatory Authority may wish to approve such installation, use and regulatory relief from such a System, by the issuance of a Special Condition as an alternative to the granting approval established by an ELOS, based upon no regulatory requirement or definition of a System which measures VVG. Regardless of the regulatory approval path used, the System attributes would be the same.

Research of prior art identifies numerous systems which measure whole aircraft descent velocity. Though it is advantageous for pilots to know the average descent velocity or sink-rate of the aircraft while approaching a runway for landing, the actual descent velocity can vary drastically due to non-pilot actions including such factors as varying wind conditions. The descent velocity of the whole aircraft hull the does not necessarily indicate the compression rate of any respective landing gear strut as it comes into initial contact with the ground.

Prior art to determine aircraft descent velocity is well documented, Reference is made to U.S. Pat. No. 3,712,122—Harris; U.S. Pat. No. 6,012,001—Scully, and U.S. Pat. No. 4,979,154—Brodeur. These and other patents describing similar but subtly different techniques teaching the use of various range-finder devices, attached to the aircraft hull, which measure the distance from the aircraft hull to the ground, with the aircraft in-flight and preparing for a landing event, as opposed to identifying initial contact with the ground nor measure the compression rate of each respective landing gear, as they come into initial contact with the ground.

As an aircraft approaches a runway for landing, if the pilot properly flares the aircraft, the sink-rate of the aircraft will be dramatically reduced, just above the runway surface. During the aircraft flare procedure, a cushion of air is developed by the downward force of air generated by the wing coming near the ground surface. This cushion of air is often referred to as "ground effect" and will substantially reduce the descent velocity of the aircraft. In ground effect, the aircraft is reaching a stall situation which reduces the lifting force generated by the wings. Aircraft wing oscillation can occur, where the aircraft wings flutter from side to side. This is another situation where an asymmetrical landing gear touch-down may occur. Aircraft sink-rate, measured with single accelerometers along the centerline of the aircraft, will not detect wing oscillation and will not determine the initial compression rate experienced by each individual land gear, when the aircraft comes into initial contact with the ground.

Additional search of prior art relating to landing gear identified U.S. Pat. No. 2,587,628—King, which teaches an apparatus for testing "yieldable load carrying structures" such as aircraft landing gear. King teaches the use of strain gauge sensors to monitor the movement of the mass supported by the landing gear, and its effects on other connected landing gear elements. King teaches the relationship between varying amounts of telescopic extension of the landing gear, as compared to shear deflection to other structural members of that same landing gear. King teaches apparatus used as a tool to determine the effective change in the fatigue life limitations of a particular landing gear structural component, by tracking the change in force applied to the shock absorbing components attached to the fatigue life limited structural component.

U.S. Pat. No. 3,517,550—Leventhal, teaches the measuring of landing gear strut pressure, as relate to forces generated "within" the landing gear strut that may exceed design limitations and possibly damage the structural integrity of a landing gear strut element.

U.S. Pat. No. 4,357,661—Lambregts teaches the use of onboard aircraft accelerometers to measure aircraft acceleration, along with ground proximity systems to alert pilots as to proper timing of aircraft flare procedures, just prior to aircraft touch-down to the runway.

U.S. Pat. No. 5,260,702—Thompson teaches of a system that interrogates various instruments of the aircraft and provides recommendations of modifications to the current in-flight sink-rate, to assist pilots in obtaining an optimal sink-rate prior to touch-down, to thereby help optimize actual sink-rate at actual touch-down.

Both Thompson and Lambregts teach of a system for use to better prepare for a smooth landing, as opposed to measuring the actual landing event.

U.S. Pat. No. 6,128,951—Nance, teaches the measuring of strut pressure while the aircraft landing gear struts are exercised, to determine the weight of the aircraft, while the aircraft is on the ground.

U.S. Pat. No. 5,214,586—Nance teaches distortions in landing gear strut pressure measurements caused by landing gear strut seal friction. Landing gear strut seal friction can distort internal strut pressure measurements by as much as 5% of the applied weight.

U.S. Pat. Nos. 7,193,530; 7,274,309; 7,274,310—Nance teach the measurement of the rate of compression of landing gear strut by a different means than that of the new invention described in this application. The prior art of Nance teaches the use of mechanical rotation sensors to measure rotation rates of rotating elements (scissor links) of the telescopic landing gear, then using geometry to determine the rate of landing gear strut compression; combined with the pressure sensors monitoring internal strut pressure increases, as a cross-check function to increase confidence in the accuracy of the mechanical measurement.

SUMMARY OF THE INVENTION

One object of the present invention is to allow an increase in the maximum landing weight of an aircraft.

It is another object of the present invention to measure respective aircraft vertical acceleration at the locations of respective landing gear struts, to further determine respective landing gear initial compression and further rate of landing gear compression.

It is another object of the present invention to mechanically identify when the initial compression of a landing gear strut has occurred.

The present invention provides a method of monitoring landing gear on an aircraft at initial contact of the landing gear with the ground, each landing gear comprising a telescopic strut which is capable of extension. The landing gear strut comprises a hull portion, which remains fixed to a hull of the aircraft when the landing gear is deployed for landing, and a tire portion, which is capable of moving with respect to the hull portion. The method comprises providing a first accelerometer on the hull of the aircraft and providing a second accelerometer on the tire portion of the strut. The acceleration of the aircraft hull is measured with the first accelerometer as the aircraft lands. The acceleration of the tire portion is measured with the second accelerometer as the aircraft lands. The acceleration of the aircraft hull is compared with the acceleration of the tire portion. The initial contact of the landing gear is determined from the comparison.

In accordance with one aspect of the present invention, the step of providing a first accelerometer on the hull of the aircraft further comprises the step of providing the accelerometer on a hull portion of the strut.

In accordance with another aspect of the present invention, further comprising the step of determining the rate of compression of the landing gear strut.

In accordance with another aspect of the present invention, further comprising the step of determining the descent velocity of the strut at initial contact.

In accordance with another aspect of the present invention, the step of determining the descent velocity of the strut at initial contact further comprises the step of determining the descent velocity of the hull portion of the strut.

In accordance with another aspect of the present invention, further steps comprise determining if the descent velocity at initial contact exceeds a predetermined threshold and providing an indication if the descent velocity at initial contact exceeds the predetermined threshold.

In accordance with another aspect of the present invention, the step of determining the descent velocity of the strut at initial contact further comprises the step of determining the descent velocity of the tire portion of the strut.

In accordance with another aspect of the present invention, further steps comprise measuring the pressure inside of the strut and determining from the pressure and accelerations when the initial contact of the landing gear has occurred.

In accordance with another aspect of the present invention, determining the descent velocity of the hull portion of the strut.

The present invention also provides an apparatus for monitoring landing gear of an aircraft during initial landing gear contact with the ground, with each landing gear comprising a telescopic strut with a compressible fluid, the landing gear strut comprising a hull portion which remains fixed to a hull of the aircraft when the landing gear is deployed for landing, and a tire portion, which is capable of moving at a different velocity, with respect to the hull portion. A first accelerometer is mounted to the hull of the aircraft and second accelerometer is mounted to the tire portion of the strut. A processor has a first input connected to the first accelerometer and a second input connected to the second accelerometer, the processor recording the acceleration of the hull portion of the strut as measured by the first accelerometer and the acceleration of the tire portion of the strut is measured by the second accelerometer, the processor comparing the acceleration of the hull portion with the acceleration of the tire portion, the processor determining the initial contact of the landing gear from the comparison.

In accordance with another aspect of the present invention, the first accelerometer is mounted on the hull portion of the aircraft strut.

In accordance with another aspect of the present invention, the processor determines the descent velocity of the hull portion of the strut at initial contact.

In accordance with another aspect of the present invention, the processor determines if the descent velocity exceeds a predetermined threshold, and if so, provides an indication that the descent velocity exceeds the predetermined threshold.

In accordance with another aspect of the present invention, a pressure sensor is located so as to measure the pressure inside the strut. The processor has an input that is connected to the pressure sensor, the processor determines from the pressure and the accelerations when the initial contact of the landing gear occurs.

In accordance with another aspect of the present invention, the processor determines the descent velocity of the hull portion of the strut as compared to the acceleration of the tire portion of the strut.

The present invention provides a method of operating an aircraft, the aircraft having a first maximum landing weight based upon a first assumed maximum descent velocity. Vertical velocities are obtained of the aircraft at initial contact of the aircraft with the ground during landing events. Based upon the obtained vertical velocities of the aircraft at initial contact with the ground, operating the aircraft at a second assumed maximum descent velocity while measuring and recording the vertical velocities of the aircraft at initial contact of the aircraft with the ground during landing events, the second assumed maximum descent velocity being less than the first assumed maximum descent velocity. Operating the aircraft at a second maximum landing weight based upon the second assumed maximum descent velocity.

In accordance with another aspect of the present invention, the second maximum landing weight is greater than the first maximum landing weight.

In accordance with another aspect of the present invention, the step of obtaining vertical velocities of the aircraft at initial contact of the aircraft with the ground during landing events further comprises the step of measuring and recording the descent velocities of the aircraft at initial contact of the aircraft with the ground, during landing events.

In accordance with another aspect of the present invention, the aircraft has landing gear, each landing gear comprising a telescopic strut which is capable of extension and compression, the landing gear strut comprising a hull portion, which remains fixed to a hull of the aircraft when the landing gear is deployed for landing, and a tire portion, which is capable of moving at a different velocity, with respect to the hull portion. The step of measuring vertical velocities of the aircraft at initial contact of the aircraft with the ground during landing events further comprises providing a first accelerometer on the hull portion of the strut, providing a second accelerometer on the tire portion of the strut, measuring the acceleration of the hull portion with the first accelerometer as the aircraft lands, measuring the acceleration of the tire portion with the second accelerometer as the aircraft lands; comparing the acceleration of the hull portion with the acceleration of the tire portion; and determining the descent velocity of the hull portion of the strut, at initial contact with the ground.

In accordance with another aspect of the present invention, the aircraft has landing gear. Each landing gear comprising a telescopic strut which is capable of extension and compression. The step of measuring a vertical velocity of the aircraft at initial contact of the aircraft with the ground during a landing event further comprises the steps of measuring the extension of the one of the telescopic struts before contact of the respective landing gear with the ground, measuring the extension of the one telescopic strut during initial contact of the respective landing gear with the ground; measuring the amount of changed extension of the one telescopic strut with respect to elapsed time; determining the rate of compression of the one telescopic strut; and determining the descent velocity of the aircraft portion of the one telescopic strut.

In accordance with another aspect of the present invention, wherein the first assumed maximum descent velocity is 10 fps.

In accordance with another aspect of the present invention, wherein the step of operating the aircraft at a second maximum descent velocity that is less than 10 fps further comprises the step of operating the aircraft at or below a second maximum descent velocity of 9.8 fps.

In accordance with another aspect of the present invention, wherein the step of operating the aircraft at a second maximum descent velocity that is less than 10 fps further comprises the step of operating the aircraft at or below a second maximum descent velocity of 9.6 fps.

In accordance with another aspect of the present invention, the step of operating the aircraft at a second maximum descent velocity that is less than 10 fps further comprises the steps of measuring and recording the vertical velocity of the aircraft at initial contact of the aircraft with the ground during a landing event, determining if the vertical velocity exceeds a predetermined threshold, and if the vertical velocity exceeds a predetermined threshold, then inspecting the aircraft before resuming flight operations.

The present invention also provides a method of operating an aircraft, the aircraft having a maximum landing weight based upon a first assumed maximum descent velocity. The descent velocities of the aircraft at initial contact of the aircraft with the ground, during landing events are measured and recorded. Determining if a measured descent velocity of the aircraft at initial contact with the ground exceeds a predetermined threshold. Inspecting the aircraft, upon determining if the measured descent velocity exceeds the predetermined threshold. Operating the aircraft at a second assumed maximum descent velocity that is less than the first assumed maximum descent velocity. Operating the aircraft at a second maximum landing weight that is greater than the first maximum landing weight, based upon the second assumed maximum descent velocity.

In accordance with another aspect of the present invention, the aircraft has landing gear, each landing gear comprising a telescopic strut which is capable of extension and compression, the landing gear strut comprising a hull portion, which remains fixed to a hull of the aircraft when the landing gear is deployed for landing, and a tire portion, which is capable of moving at a different velocity, with respect to the hull portion, the step of measuring vertical velocities of the aircraft at initial contact of the aircraft with the ground during landing events further comprises the steps of providing a first accelerometer on the hull portion of the strut, providing a second accelerometer on the tire portion of the strut, measuring the acceleration of the hull portion with the first accelerometer as the aircraft lands, measuring the acceleration of the tire portion with the second accelerometer as the aircraft lands, comparing the acceleration of the hull portion with the acceleration of the tire portion, and determining the descent velocity of the hull portion of the strut, at initial contact with the ground.

In accordance with another aspect of the present invention, the aircraft has landing gear, each landing gear comprising a telescopic strut which is capable of extension and compression, the step of measuring a vertical velocity of the aircraft at initial contact of the aircraft with the ground during a landing event further comprises the steps of measuring the extension of the one of the telescopic struts before contact of the respective landing gear with the ground, measuring the extension of the one telescopic strut during initial contact of the respective landing gear with the ground, measuring the amount of changed extension of the one telescopic strut with respect to elapsed time, determining the rate of compression of the one telescopic strut, and determining the descent velocity of the aircraft portion of the one telescopic strut.

BRIEF DESCRIPTION OF THE DRAWINGS

Although the features of this invention, which are considered to be novel, are expressed in the appended claims, further details as to preferred practices and as to the further objects and features thereof may be most readily comprehended through reference to the following description when taken in connection with the accompanying drawings, wherein:

FIG. 3 is "Table 2, page 10" taken from DOT/FAA/AR-08/12: VIDEO LANDING PARAMETER SURVEYS—CINNICINATI/NORTHER KENTUCKY AND ATLANTIC CITY INTERNATION AIRPORTS, being the FAA Tech Center Survey Data comparing aircraft landing parameters, illustrating in particular: Average Sink Speed—for various aircraft models.

FIG. 4 is a table showing an example of increasing aircraft landing weight which could be allowed by reduced vertical velocity assumptions.

FIGS. 5a, 5b and 5c are sequential side views of a vertical telescopic landing gear strut, shown with various amounts of compression, both a pre-touchdown fully extended posture then post-touchdown initially compressed posture, as compared to elapsed time; with illustrations of Software Program "Alpha"—landing gear pressure monitoring, and Software Program "Beta"—landing gear acceleration monitoring.

FIGS. 5d, 5e and 5f are sequential side views of a trailing arm design landing gear strut, shown with various amounts of compression, both a pre-touchdown fully extended posture then post-touchdown initially compressed posture, as compared to elapsed time; with illustrations of Software Program "Alpha"—landing gear pressure monitoring, and Software Program "Beta"—landing gear acceleration monitoring.

FIG. 6 is a further illustration of Software Program "Beta"—landing gear acceleration monitoring by parallel and converging data streams.

FIGS. 8a, and 8b are an illustration of Software Program "Delta"—aircraft Vertical Velocity at initial contact with the Ground "VVG", threshold and exceedance determination.

DETAILED DESCRIPTION OF THE PREFERRED EMBODIMENT

Figure 1:
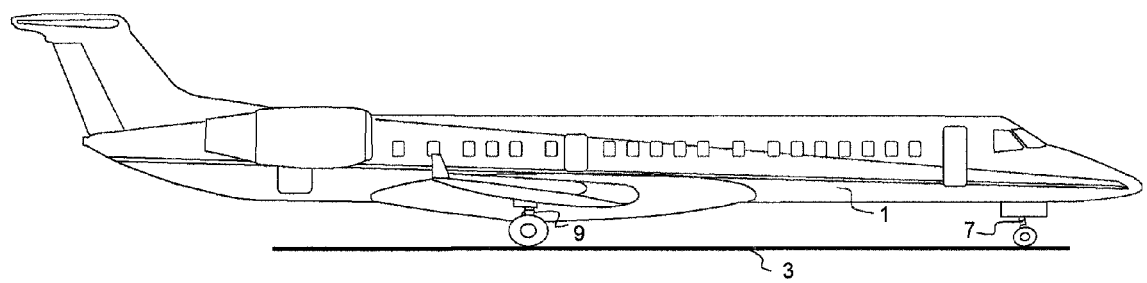
FIG. 1 is a side view of a typical transport category aircraft with nose and main landing gear deployed.

In the description herein, the disclosures and all other information of my earlier U.S. Pat. Nos. 7,193,530; 7,274,309 and 7,274,310 are incorporated by reference.

The present invention measures and determines the compression rate experienced by each landing gear strut on initial contact with the ground. The strut is monitored for compression so as to confirm that the aircraft has come into contact with the ground and also to determine the rate of strut compression and the aircraft vertical descent velocity.

The present invention detects initial and continued compression of the landing gear strut by rapidly monitoring internal strut pressure, prior to initial contact with the ground, as well as throughout the remainder of the landing event. Dual measurements of vertical acceleration are also monitored at a very rapid rate and are stored within a computer which is part of the system. The computer then compares changes in strut pressure to determine the amount of strut compression in relation to elapsed time. The computer also compares changes in vertical acceleration of opposing sides of telescopic elements of the landing gear strut, to determine the amount of strut compression, in relation to elapsed time. Strut compression includes strut extension and compression.

The present invention works with both types of telescopic strut designs, including true vertical strut designs, as well as trailing arm strut designs. The rate of strut compression corrected for aircraft hull inclination to horizontal, is the vertical velocity of the aircraft as it comes into initial contact with the ground.

The trailing arm landing gear has a different design than the vertical strut design. The trailing arm design forms a triangle with the three sides consisting of: a primary vertical strut body, a hinged trailing arm and a telescopic shock absorber. As the hinged trailing arm of landing gear rotates from compression, the side consisting of the telescopic shock absorber will become shorter, changing the geometry of the triangle. The changing geometry, measured against elapsed time, will determine the vertical compression rate of the trailing arm landing gear design. The detection and rate of landing gear strut movement are determined during the moment of initial contact of the landing gear with the ground. Upon detection of the initial movement of a respective landing gear strut, the step of monitoring the rate and amount of additional strut compression is used to determine the initial touch-down and VVG (Vertical Velocity at initial contact with the Ground) of each respective landing gear strut.

This invention also provides methods of identifying, defining and illustrating various means of justification, for aviation Regulatory Authorities to allow for modifications to the design criteria regulations for transport category aircraft. The methods described herein develop various strategies for the justification of reductions to assumed limit descent velocity design criteria, from the current value of 10 fps; along with the related increase in airplane maximum landing weight (MLW).

Use of apparatus which measure aircraft VVG, along with the use of methods and strategies for the review, analysis and documentation of FAA Regulations and FAA Tech Center aircraft sink-speed survey data which illustrate current Part 25 Chapter §25.473 limit descent velocity assumptions being more than adequate; creates operational procedures safer than what would be considered an Equivalent Level Of Safety. Current Part 25 aircraft operational procedures provide no means for actual measurement and display of aircraft VVG to the aircraft flight crew, where this new invention offers methods of using measured VVG to allow for reduction to Part 25 Chapter §25.473 limit descent velocity assumptions, and the associated increase in aircraft MLW. The methods of this new invention further develop strategies for new requirements, for implementation of operational procedures to assure Regulatory Authorities; that allowing a reduction in the limit descent velocity assumption with its subsequent increase in Part 25 aircraft MLW, will offer an Equivalent Level Of Safety, and an alternative means of regulatory compliance.

Referring now to the drawings, wherein like reference numerals designate corresponding parts throughout the several views and more particularly to FIG. 1 thereof, there is shown a typical transport category aircraft 1, resting on the ground 3, supported by, as shown, one of plural main landing gear 9, and a single nose landing gear 7.

Figure 2A:
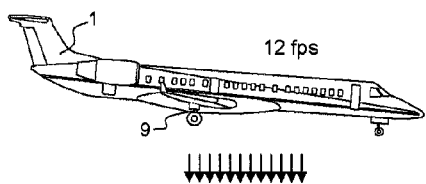
FIGS. 2a, 2b, and 2c are views of a transport category aircraft showing respectively: on final approach descending towards the ground; executing a proper flare procedure to reduce vertical velocity prior to initial contact with the ground; and making "initial contact" with the ground.

Referring now to FIG. 2a there is shown the transport category aircraft 1 in a typical landing approach posture, as it descends toward the ground 3. Deployed from the lower body of aircraft 1, are main landing gear 9. Main landing gear 9 absorbs the initial landing forces as aircraft 1 come into initial contact with the ground 3. Each of the downward pointing arrows (↓) represents the equivalent of 1 fps. This initial aircraft shown has a total of twelve ↓ and represents the aircraft descending at 12 fps.

Figure 2B:

Referring now to FIG. 2b there is shown the transport category aircraft 1 as it executes a flare procedure. The nose of the aircraft is brought to a higher angle of attack which brings the aircraft closer to a stall configuration, which helps reduce aircraft 1 horizontal speed as well as the rate of vertical descent. The flare procedure is executed to quickly reduce the aircraft vertical descent velocity. Upon execution of the flare procedure the aircraft now shows a total of four ↓ and represents the aircraft's reduced vertical velocity (being the VVG), and descending towards the ground at 4 fps.

Figure 2C:
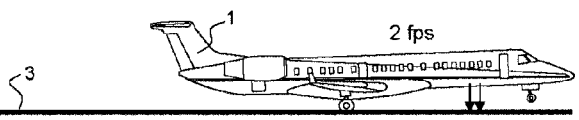

Referring now to FIG. 2c there is shown the transport category aircraft 1 as it comes into initial contact with the ground 3. After successfully completing the flare procedure (as shown in FIG. 2b), aircraft 1 has reduced its horizontal velocity as well as the vertical descent velocity and in this example, gently comes into contact with the ground 3 at a vertical descent rate of 2 fps. Though the aircraft has come into initial contact with the ground, until the total weight of the aircraft has become totally supported by the compressing landing gear 9; the VVG of aircraft 1 will continue to decrease until such time as the vertical velocity becomes zero, being at some point after the aircraft has come into initial contact with the ground.

Referring now to FIG. 3, there is shown "Table 2, page 10" taken from DOT/FAA/AR-08/12: VIDEO LANDING PARAMETER SURVEYS—CINNICINATI/NORTHERN KENTUCKY AND ATLANTIC CITY INTERNATION AIRPORTS, being a comparison of Landing Parameters by Aircraft Model, CVG Survey.

Beginning in 1993, the FAA William F. Hughes Technical Center initiated a series of surveys which measured aircraft landing parameters at various airports around the world. There were a total of ten surveys completed: Atlantic City 1993, John F. Kennedy International 1997, Washington National 1999, Honolulu International 2001, London City Airport 2004, Philadelphia International 2004, Atlantic City International 2004, London Heathrow 2007, Atlantic City International 2008, and Cincinnati Airport 2008. Data shown herein is from the most recent 2008 survey data recorded at the Cincinnati Airport and shows various aircraft average sink-speeds with the "Mean" (shown in bold) ranging from 1.3 fps to 2.2 fps.

The average range near 2 fps is far lower than the Regulatory Authorities 10 fps assumptions, as defined in Part 25 aircraft design criteria. The "Average Sink Speed" parameters reveal larger aircraft have tendencies to land at slightly higher sink speed than smaller aircraft. But regardless of the size of the aircraft, no aircraft in the survey showed an average sink speed near a range of 6 fps (which allows aircraft to land up to the much higher maximum take-off weight) or the assumed 10 fps limitation used for determining aircraft maximum landing weight.

Referring now to FIG. 4 there is shown a table illustrating the relationship between aircraft vertical velocity at initial contact with the ground "VVG", as compared to aircraft landing weight. Aircraft landing weight and the vertical velocity at which that weight comes into initial contact with the ground, are the primary factors for the Part 25 aircraft design criteria and are used to determine the kinetic energy at touchdown. A typical expression of Kinetic Energy "KE" is "one-half the mass times the velocity squared":

$$KE = \tfrac{1}{2} Mass \times Velocity^2$$

The calculations contained herein are that for a typical Part 25 transport category aircraft. Used as an example is the Brazilian manufactured Embraer EMB 145-XR. The design maximum take-off weight "MTOW" for the EMB 145-XR is 53,131 pounds and is indicated in Column a, Row 1. The MTOW value remains unchanged in Column a, throughout Rows 1-6.

In further illustration of this matrix and defining the values horizontally across Columns b through g, within Row 1 are as follows:

Column b is the "original" design landing weight limitation of the EMB 145-XR aircraft, and is 44,092 pounds. Column c is 22,046 pounds, which is ½ of the amount of Column b which represents the weight (or mass) supported by one of the two main landing gear, which absorb the aircraft's initial landing impact. Column d is 11,023 pounds, which is ½ of the amount of Column c, to correspond to the "½ Mass" segment of the KE equation. Column e is the "assumed vertical velocity" of the aircraft, as it comes into initial contact with the ground "VVG." As a starting point for the calculations of this matrix, the Column e, Row 1 amount is equal to the Part 25 aircraft limit descent assumption of 10 fps. Column f is the squared amount of an assumed but subsequently "measured" vertical velocity of the respective velocity value of Column e. Multiplying the "½ Mass" value shown in Row 1 Column d times the velocity squared value in Column f generates Column g, being a Kinetic Energy value of 1,102,300. This Kinetic Energy value in Column g represents the aircraft manufacturer's originally designed structural integrity associated with the EMB 145-XR aircraft, based upon the 10 fps assumption and the value associated with the determination of the aircraft MLW limitation shown in Row 1 Column b.

Looking down Column g, through Rows 2-6, the 1,102,300 Kinetic Energy value must remain unchanged. Keeping the 1,102,300 value a "constant" throughout the lower Rows of the matrix insures the manufacturer's original design structural integrity will not be exceeded. Maintaining the 1,102,300 value and reversing through the Kinetic Energy equation, using lower but "measured" vertical velocity values within Column e Rows 2-6, allows for determination and illustration of the increased aircraft landing weights, as shown in Column b, Rows 2-6, based on lower VVG assumptions.

In continuation as a further example: across Row 5, wherein vertical velocity in Column e is reduced to 9.6 fps, (and averting any exceedance of the 1,102,300 KE value shown in Column g), the MLW limitation is now determined by solving for mass in the equation: $1,102,300 = \tfrac{1}{2}(mass) \times (9.6)^2$. The mass (MLW) is now 47,843; which is an increase in the aircraft design landing weight of 3,751 pounds, as shown in Column i.

With the installation and use of the invention, Column e being the Vertical Velocity will now become an actual measured vertical velocity. The elimination of having to rely on assumptions of VVG, is now replaced with actual measured vertical velocities.

Column h, Rows 2-6 are the values for additional amounts of landing weight, being associated with respective reduced vertical velocity, for a single landing gear strut; and Column i, Rows 2-6 are those respective values multiplied by two, accounting for both main landing gear, for the total increase in landing weight, associated with reduced vertical velocity for the entire aircraft. As can be seen by Columns e and i, as the assumed touchdown vertical velocity decreases slightly from 10 fps to 9.9, the MLW increases by 895 pounds. As the touchdown vertical velocity decreases even more, the MLW increases (e.g. for 9.5 fps, MLW increases by 4,763 pounds).

Thus, reducing the assumed, but now measured, touchdown vertical velocity allows more weight (passengers, cargo, fuel, etc.) to be carried by the aircraft.

Column j Rows 1-6, are the calculations of the respective Kinetic Energy values associated with even further reduced descent velocity (for example: at a constant 6 fps) when calculated by the respective increasing landing weights values of Column b, Rows 1-6. Considering all of the values in Column j are below 440,000 and the original design structural integrity of the EMB 145-XR is a value of 1,102,300, there is strong justification that landing events at velocities below 6 fps do not come near to approaching the original design structural integrity of the aircraft. This reinforces the justification that requirement of "post landing" aircraft inspections with measured VVG values of 6 fps or greater offer a Superior Level Of Safety than landing events without VVG measurement or detection, which might possibly allow a damage aircraft to remain in operation without inspection.

The table illustrates the striking evidence, that reductions in vertical velocity, as a function of the velocity value squared sharply reduces the Kinetic Energy values. Column k equates to the Kinetic Energy values associated with a much lower 2 fps assumption; that being shown in Column l, and is less than 4.50% of the original aircraft structural design values.

Regulatory Authorities require only the demonstration of an Equivalent Level Of Safety, when asking for modifications in certification rules. Use of apparatus and methods of this invention offer a Superior Level Of Safety.

By means of the use of an "inverse argument" one can best illustrate the reasoning of this Superior Level Of Safety, with a hypothetical situation: suppose Regulatory Authorities have previously allowed relief in the design criteria VVG assumption from 10 fps to 9.6 fps, with the requirement that all landing events be measured; the Regulatory Authorities would surely become comfortable that aircraft landing events would be no longer subject to mere assumptions, but assured by the fact that all subsequent landing events were verified with actual measured VVG data. Supposing the Regulatory Authorities were then given the opportunity to undo the design criteria relief, back to 10 fps, with the condition that no further landing events would be verified by measured data. The Regulatory Authorities would assuredly deny any such request to remove equipment form the aircraft that provides safety information, to then rely only on mere assumptions. This is the primary argument for justification that aircraft design criteria assumptions of 9.6 fps with "measured" VVG data, is an Equivalent Level Of Safety, to that of 10 fps assumptions, with "no measured" VVG data.

Referring now to FIGS. 5a, 5b and 5c; there is shown the apparatus of the invention for a "vertical telescopic" landing gear design, and illustrations of Software Program "Alpha"—initial touch-down determination and landing gear compression measured (strut pressure) to determine that the aircraft has come into initial contact with the ground; and Software Program "Beta"—initial touch-down determination by landing gear compression measured (dual acceleration) against elapsed time to determine aircraft vertical velocity at initial contact with the ground, being the aircraft "VVG".

Illustrated across the bottom through FIGS. 5a, 5b and 5c is an arrow extending from left to right. This arrow represents ELAPSED TIME. The vertical lines on the arrow divide ELAPSED TIME into increments of 10/1000th of a second. ELAPSED TIME begins at the initial contact with the ground and extends to the completion of a landing event. Prior to the initial contact with the ground, ELAPSED TIME is illustrated in negative numbers, counting down to initial contact with the ground.

Shown by FIGS. 5a, 5b and 5c are a sequence of views of a "vertical telescopic" aircraft main landing gear 9, as would be deployed from an aircraft hull 1. When the landing gear 9 is deployed from within aircraft hull 1 and locked into place prior to the landing event, the body of landing gear 9 maintains a fixed position in relation to aircraft hull 1. Though the primary body of landing gear 9 is fixed to aircraft hull 1 with movement monitored by a first accelerometer 17, telescopic piston 13 will recede into the body of landing gear 9 as the landing gear 9 absorbs the impact of the aircraft landing event and the movement of piston 13 in monitored by a second accelerometer 19. The working pressure within landing gear 9 is continually monitored and measured by a pressure sensor 21.

FIG. 5a shows aircraft 1 with a deployed main landing gear 9, which includes a telescopic piston 13, and rubber tire 5 (tire 5 shown as dashed lines). Landing gear 9 is above the ground 3, while the aircraft is still in flight, with no weight being supported by landing gear 9. Landing gear 9 contains internally both a non-compressible fluid (such as hydraulic oil) and a compressible gas (such as nitrogen). As telescopic landing gear 9 compresses upon landing, the volume and dimensional length of landing gear 9, with telescopic piston 13, will change. The internal pressure of the compressible nitrogen gas within telescopic landing gear 9 will increase in direct proportion to the reduced gas volume within landing gear 9. This is attributed to Boyle's Gas Law, "pressure has a proportional relationship to volume."

For landing gear 9 to function at its maximum effectiveness, it is important that telescopic piston 13 be extended to its full limits, prior to the aircraft landing. While aircraft 1 is above the ground 3 and the landing gear 9 supporting no weight, landing gear 9 maintains what is commonly referred to as a "pre-charge pressure." This pre-charge pressure is a relatively low pressure, but of a sufficient amount of pressure to force the telescopic feature of strut piston 13 to maintain its full extension limits, while bearing no weight. With strut piston 13 at full extension, landing gear 9 is capable of absorbing the maximum design landing load limits for aircraft 1. As tire 5 comes into contact with the ground 3 (FIG. 5b), the pressure within landing gear 9 will increase in direct proportion to internal volume decrease of landing gear 9. As an example: shown in FIG. 5a, the pre-charge pressure within telescopic landing gear 9 is 200 psi. (As additional reference: when a fully loaded aircraft is resting on its plural landing gear, and the landing gear are at near full compression, the loads on a typical main landing gear can generate internal pressure up to 2,300 psi)

FIG. 5a shows the landing gear 9 before initial touchdown, FIG. 5b shows the landing gear at initial touchdown and FIG. 5c shows the landing gear just after initial touchdown. The strut compresses after initial touchdown. This is illustrated by changes in two dimensions. One dimension is between first accelerometer 17 and second accelerometer 19, and is shown as Dimension "a" in FIG. 5b; this changes to Dimension "b" in FIG. 5c. For example, dimension "a" is 2.33 feet, while Dimension "b" is 2.25 feet. Dimension "x" in FIG. 5b is the distance from first accelerometer 17 to the ground 3; this changes from Dimension "x" (e.g. 4.83 feet) in FIG. 5b to dimension "y" (e.g. 4.75 feet) in FIG. 5c.

ELAPSED TIME is monitored by an internal clock, located within the system's computer 25 (see FIG. 8). Prior to the commencement of initial touchdown (where ELAPSED TIME=0), aircraft 1 is still in flight, with main landing gear 9 at full extension, maintaining a constant pre-charge pressure of 200 psi. At the beginning of the landing event (see FIG. 5b), the main landing gear tire 5 comes into initial contact with the ground 3, beginning a compression of landing gear 9. The illustration of the landing gear in FIG. 5b is identical to that of FIG. 5a, other than FIG. 5b initiates the landing event being initial contact with the ground 3, and the beginning of ELAPSED TIME.

The illustration of FIG. 5c is that of the landing gear 9 initial compression, after $^{28}/_{1000}$th of a second, from initial contact with the ground 3. At the exact moment of initial contact with the ground 3 the pressure within telescopic landing gear 9 will increase from its in-flight, steady state 200 psi pre-charge pressure (FIGS. 5a and 5b), to a now higher "initial touchdown" pressure of 201 psi (FIG. 5c). This change in pressure identifies a change in strut compression, caused by tire 5 coming into initial contact with the ground 3. This identification of initial landing gear strut compression is the basis for Software Program "Alpha"—initial touch-down determination and landing gear compression, by measured pressure increase.

Attached to aircraft hull 1 is inclinometer 23. Inclinometer 23 measures aircraft hull 1 angle, in particular aircraft 1 relationship to horizontal, during the landing event. As tire 5 of landing gear 5 come into contact with the ground 3; if aircraft hull 1 is not horizontal, having landing gear 9 in a non-vertical position; measurements from inclinometer 23 are used to correct any non-horizontal angle of aircraft 1, and correct the calculations of the compression rate of the non-vertical landing gear 9, to that of landing gear 9 being vertical (more fully described in FIGS. 7a and 7b).

Dual accelerometers 17 and 19 are mounted at opposing locations of the compressible area of telescopic landing gear 9. One accelerometer 17 is mounted on the airframe or hull, side of the landing gear, while the other accelerometer 19 is mounted to the tire side of the landing gear. The hull side of the landing gear is relatively fixed to the hull after the landing gear has been deployed for landing. In contrast, the tire side of the landing gear moves with respect to the hull side due to the strut being extendible as shown in FIG. 5a and compressible as shown in FIG. 5c. In the preferred embodiment, the hull side accelerometer 17 is mounted on the landing gear strut just above the piston 13. However, the accelerator 17 could be mounted elsewhere on the strut or even on the aircraft hull 1. Likewise, the tire side accelerometer 19 can be mounted anywhere on the tire side.

Dual accelerometers 17 and 19 continually monitor acceleration through the flight of the aircraft 1, as well as vertical descent of the aircraft 1, and the "sudden jolt" of the landing event, to be a cross-check function. Determination that accelerometers 17 and 19 are producing accurate data is verified by their developing matching acceleration data streams while the aircraft is in flight.

As explained in more detail with reference to FIG. 6, as tire 5 of landing gear 9 comes into initial contact with the ground 3, corresponding accelerations measured by accelerometers 17 and 19 identify accelerometer 17 is moving at a different velocity than accelerometer 19. This identification of differential velocity determines the initial contact with the ground 3. Mathematical algorithms are used to measure changes in acceleration, against ELAPSED TIME, for the determination that dimension "a" has changed to dimension "b".

The outer diameter of tire 5 is a relative constant, other than the spring-rate elasticity from the rubber compound of tire 5, and a very minor increase in tire 5 diameter, from the rapid increase in rotation, as tire 5 comes into initial contact with the ground 3. This minuscule change in diameter has little to no effect on the accuracy to measure VVG.

As tire 5 has come into initial contact with the ground, accelerometer 19 senses a change in acceleration and thus reflects the tire 5 contacting the ground 3; the accelerometer 17 senses an unchanged acceleration.

The monitoring, measuring and calculations made from pre-landing through post-landing "differential" accelerometer data streams, from dual accelerometers 17 and 19 and their relationship to the distance of aircraft hull 1 to the ground 3 described herein is the basis for Software Program "Beta"—initial touch-down determination, and landing gear compression measured (by acceleration data), against elapsed time; to determine aircraft vertical velocity, or VVG.

In an alternate application, there is shown FIGS. 5d, 5e and 5f which are sequential views of an alternate type aircraft main landing gear strut assembly namely a trailing arm landing gear strut assembly, as would be attached to an aircraft hull. The attachment of the landing gear body 9 to the airframe structure is represented herein by a small portion of aircraft hull 1. When the landing gear assembly is extended from within aircraft hull 1 and locked into place for the landing event, landing gear body 9 maintains a fixed position in relation to aircraft hull 1. Though landing gear body 9 is fixed to aircraft hull 1, trailing arm 11 and telescopic shock strut 15 will change their relative positions, as the landing gear assembly compresses and absorbs the impact of the landing event.

FIG. 5d shows the aircraft 1 and main landing gear 9 above the ground 3, while the aircraft is still in flight, with no weight being supported by the landing gear 9. The components of the landing gear assembly form a triangle, shaped by the hinged elements of trailing arm 11 to landing gear strut body 9, which are both "fixed length" elements, and a third side of the triangle with "variable dimension" being a telescopic shock absorbed 15. Telescopic shock absorber 15 contains both a non-compressible fluid (such as hydraulic oil) and a compressible gas (such as nitrogen), As telescopic shock strut 15 compresses, the geometry of the landing gear triangle will change. As the volume/length of shock absorber 15 changes, the internal pressure of the compressible nitrogen gas will increase in direct proportion to the reduced gas volume within telescopic shock strut 15. This is attributed to the principle of Boyle's Gas Law, "pressure has a proportional relationship to volume."

For the trailing arm design landing gear to function at its maximum effectiveness, it is important that telescopic shock strut 15 be extended to its fully extended limits, prior to the aircraft landing. With telescopic shock strut 15 at full extension, the angle made by landing gear body 9 and trailing arm 11 will be at its widest angle. While aircraft 1 is above the ground and the landing gear supporting no weight, telescopic shock strut 15 maintains a "pre-charge pressure." As the aircraft 1 comes into contact with the ground 3, the pressure increases within telescopic shock strut 15 is proportionately associated with the volume decrease of shock strut 15.

Even though telescopic shock strut 15, is not at a true vertical position, the relationship between changes of internal pressure within shock strut 15 as compared to vertical compression of the landing gear assembly, can be calculated by mathematical algorithm as a "direct proportion" to the differential measurements between Dimension "a" to that of Dimension "b". As an example: shown in FIG. 5d, the pre-charge pressure within telescopic shock strut 15 is 200 psi. The working pressure within shock strut 15 is continually monitored and measured by a pressure sensor 21.

Shown throughout FIGS. 5d, 5e and 5f ELAPSED TIME is again illustrated as an arrow extending from left to right, with the beginning of ELAPSED TIME commencing at the exact moment landing gear tire 5 comes into contact with the ground 3. Prior to the commencement of ELAPSED TIME, aircraft 1 is still in flight, with shock strut 15 at full extension, maintaining a constant pre-charge pressure of 200 psi. At the beginning of ELAPSED TIME, the main landing gear tire 5 comes into initial contact with the ground 3 where the pre-landing extension of the landing gear assembly will begin to change. The illustration of the landing gear in FIG. 5e is identical to that of FIG. 5d, other than FIG. 5e initiates the landing event and the beginning of ELAPSED TIME. The illustration of FIG. 5f is that of the landing gear initial compression, at $2^1/_{1000}$ of a second, after initial contact with the ground 3. At the exact moment of initial contact with the ground 3 the pressure within telescopic shock strut 15 has increased from its "in-flight" steady state 200 psi pre-charge pressure, to a now higher pressure of 201 psi. This change in pressure identifies a change in strut compression, caused by aircraft 1 coming into initial contact with the ground 3. This illustrates additional features of Software Program "Alpha"—initial touch-down determination and trailing arm design landing gear compression measured by pressure data.

As described in the vertical telescopic strut of FIG. 5a, shown here in FIG. 5d the trailing arm design landing gear also uses dual accelerometers 17 and 19, mounted at opposing sides of the compressible area of the landing gear, on the lower extremities of trailing arm 11 and above the landing gear compressible area on aircraft hull 1. As aircraft 1 lands, the invention will identify that the landing gear has experienced initial compression as well as the amount of further compression of the landing gear assembly throughout the entire landing event, by identifying differences in acceleration data streams, between accelerometer 17, to that of accelerometer 19.

The variable distance between the aircraft hull 1, with its location of accelerometer 17, and the lower portion of trailing arm 11 with its accelerometer 19, is illustrated as Dimension "a", and for this aircraft example: Dimension "a" is a distance of 4.33 feet.

Illustrated by a comparison of FIG. 5e to that of FIG. 5f, Dimension "a" will change as a function of the separation and/or closure between accelerometer 17 and accelerometer 19, and is determined through the examination of parallel acceleration data streams, monitored during the landing event (illustrated in more detail in FIG. 6).

As telescopic shock strut 15 compresses, the geometry of the landing gear assembly triangle will change. That change in geometry is directly proportional to the amount of change in Dimension "a" illustrated here as 4.33 feet; to that of Dimension "b" illustrated here as 4.25 feet (FIG. 5O.

The monitoring, measuring and calculations made from pre-landing through post-landing "differential" in accelerometer data streams, from dual accelerometers 17 and 19 and their relationship to the distance of aircraft hull 1 to the ground 3 described herein illustrates additional features of Software Program "Beta"—initial touch-down determination, and landing gear compression measured (by acceleration data), against elapsed time to determine aircraft vertical velocity. The software program records the acceleration data provided by the first and second accelerometers 17, 19.

The examples explained herein both: pressure increase data, and dual acceleration data stream differential identification will allow for the identification of the aircraft VVG at initial contact with the ground.

In FIGS. 5a-5f, the accelerometers 17, 19 and pressure sensor 21 are shown with a portion of the connecting wires which connect these devices to the computer 25.

There is shown in FIG. 6, a meandering and downward sloping dotted-line 27 which illustrates the accelerometer data stream of the aircraft as measured by accelerometer 17 (shown in FIGS. 5a, 5b, and 5c). A second meandering and downward sloping dashed-line 29 illustrates the accelerometer data stream of the lower portion of the compressible landing gear as measured by accelerometer 19 (shown in FIGS. 5a, 5b, and 5c). In FIG. 6, even though for much of the time the accelerations are substantially similar, the two lines are not shown overlapping but are spaced apart from each other so as to represent the physical separation of the two accelerometer units, mounted onto the single landing gear assembly, and being the distance of Dimension "a" FIG. 5a. Illustrated across the bottom of FIG. 6 is an arrow extending from left to right and represents ELAPSED TIME. The vertical lines on the arrow divide ELAPSED TIME into "two second" increments.

Dual accelerometers 17 and 19 (shown in FIGS. 5a, 5b, and 5c) monitor and measure vertical acceleration of the aircraft along with the attached landing gear elements. While the aircraft is in steady level flight, assumptions would be that the aircraft accelerometers would show neither positive nor negative measurement of vertical acceleration. As an aircraft prepares for a landing event, varying wind conditions and air-turbulence make it near impossible for the aircraft to maintain a neutral state of vertical acceleration. Vertical acceleration is identified as movement in relation to freefall and the most common unit of measure is g-force; which is movement either up or down in relation to a constant 1 g, being the constant gravity of the Earth. As the aircraft increases in altitude, the acceleration will be identified by a positive measurement or an increase in positive g-force. As the aircraft decreases in altitude, the acceleration will be identified by a negative measurement or an increase in negative g-force.

Working from left to right across FIG. 6, initially the acceleration data streams 27 and 29 identify the aircraft descending at a rate of 9 fps, this being about fourteen seconds prior to initial contact with the ground. Continuing along the path of ELAPSED TIME, at about eleven seconds prior to initial contact with the ground, the flight of the aircraft is taken through a flare procedure, where the accelerometer data streams 27 and 29 identify the aircraft vertical velocity reduced to 3 fps. The two data streams 27, 29 are substantially identical to each other and show substantially the same acceleration.

Initial contact with the ground begins at Point "A" and is the beginning of ELAPSED TIME. At Point "A" accelerometer data stream 29 which monitors the movement of the lower portion of the landing gear, as measured by lower accelerometer 19 (FIG. 5c) and identifies a sudden change in acceleration followed by zero change in acceleration, to reflect the contact with the ground while accelerometer data stream 27 as measured by accelerometer 17 (FIG. 5c), which monitors the movement of the upper portion of the landing gear (being the same as the aircraft hull) continues to show movement towards the ground 3. The recognition of differential acceleration data, from what had been substantially similar acceleration data streams, identifies initial contact with the ground. The further comparison of differential acceleration determines the vertical velocity of the aircraft at initial contact with the ground, as well as the further reduction in vertical acceleration as the landing gear absorbs the aircraft landing loads.

Through evaluation of acceleration data, the invention will identify that the landing gear has experienced initial compression, as well as the amount of further compression of telescopic landing gear 9 throughout the entire landing event, by identifying differences in acceleration data stream 27, to that of accelerometer data stream 29.

The vertical velocity at initial contact can be determined using the methods described in my earlier U.S. Pat. No. 7,274,310. Such methods include measuring the extension of the strut over elapsed time or measuring the rotation of a linkage strut over elapsed time. Furthermore, acceleration measurements can be used to determine vertical velocity. For example, the acceleration over elapsed time can be used to determine vertical velocity at initial contact.

Some compensation may be needed to increase the accuracy of the measurements. For example, "initial contact" as used herein may be the first contact of the landing gear with the ground or it may be a subsequent contact, such as may be encountered after a bounce. Thus, one type of compensation would be to determine the contact of interest. Such contact would typically be the hardest contact.

Figure 7A:
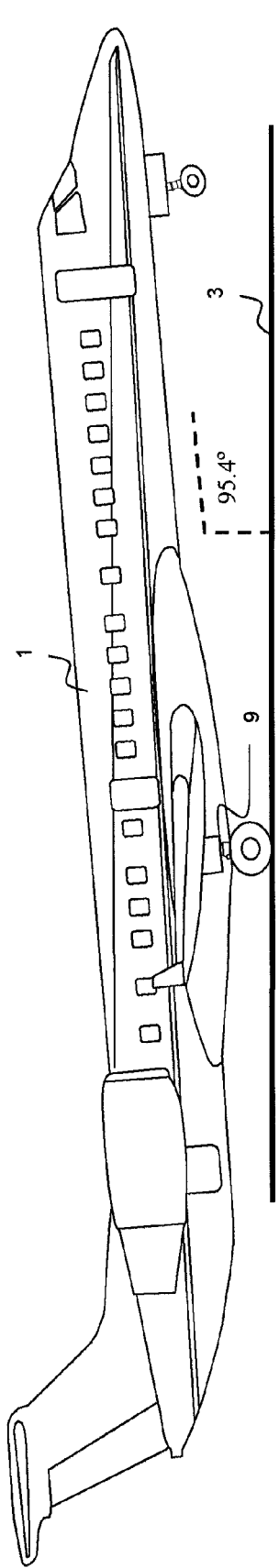
FIGS. 7a and 7b are an illustration of Software Program "Gamma"—aircraft hull angle correction to horizontal, which uses inclinometer data to correct rate of strut compression calculations for non-level aircraft angle.
Figure 7B:
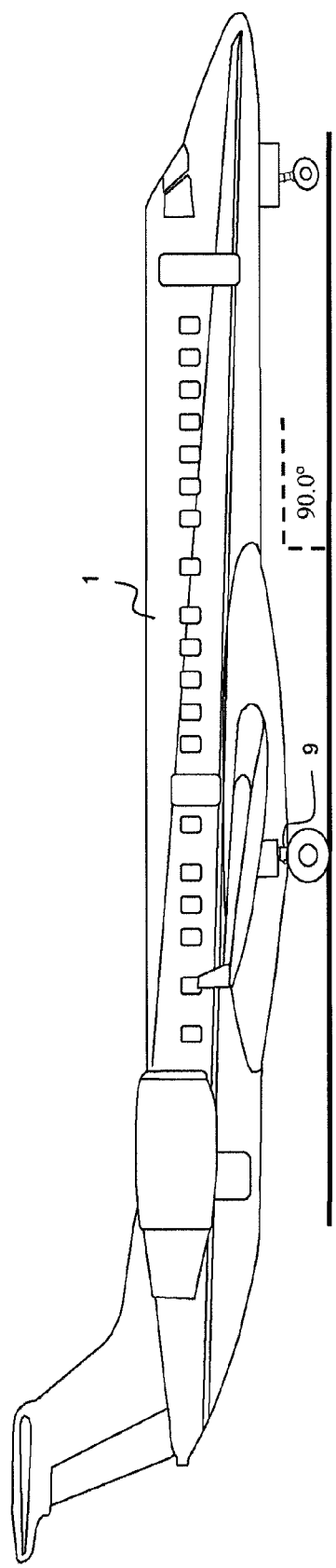

Another type of compensation has to do with inclination of the airframe to horizontal. Referring now to FIGS. 7a and 7b there is shown an illustration of Software Program Gamma—Aircraft Hull Angle Compensation, which compensates for the aircraft hull 1 not being horizontal and level, as the aircraft starts and continues through the landing event. Shown in FIG. 7b is horizontal aircraft hull 1, with attached perpendicular landing gear 9, where perpendicular landing gear 9 has a measured angle (measured by the inclinometer 23) of 90.0° to that of the ground 3. The aircraft 1 with perpendicular landing gear 9 shown in FIG. 7a has a measured angle of 95.4° to that of the ground 3.

The angle of landing gear strut body 9 in relation to this example of aircraft hull 1 is fixed perpendicular and does not change (as shown in FIGS. 5a, 5b and 5c). Furthermore, while the aircraft is in flight and commences to flare the aircraft hull 1 for the landing event, aircraft hull 1 will change angle prior to and during the landing event. Adjustments for the changing angle of aircraft hull 1, to that of what the aircraft hull 1 would be when parallel to ground 3 (see FIG. 7b) are made to correct for differences in landing gear compression determinations, as compared to strut body 9 (see FIG. 5d) when vertical/perpendicular to the ground 3. In the example shown, the correction from 95.4° non-vertical landing gear 9 (FIG. 7a), to that of the 90.0° vertical landing gear 9 (FIG. 7b) will be an adjustment of 5.4°. Mathematical algorithms make adjustments to correct the landing gear rate of compression, to that equivalent of landing gear 9 being vertical and aircraft hull 1 being in a level position, parallel to ground 3, so as to determine the "true" vertical value of descent velocity. Alternatively, the inclinometer 23 can be attached to a vertical portion of landing gear strut body 9 to measure directly the inclination of the strut body 9 to allow for correction, and obtain a true vertical descent velocity. This inclination angle correction program may be applied to all compressible landing gear designs, whether they are a vertical telescopic design as shown in FIG. 5a, or the triangular shape of the trailing arm design shown in FIG. 5d.

Referring now to FIGS. 8a and 8b there is shown an illustration of Software Program Delta—Aircraft Vertical Velocity at initial contact with the Ground "VVG", and Exceedance Determination. Software Program Delta measures the aircraft VVG on all landing events. The software program determines the descent velocity of the aircraft at initial contact with the ground and also determines if the descent velocity exceeds a predetermined threshold, and the software program provides and indication to the flight crew and/or maintenance personnel if the threshold is exceeded.

Shown in FIG. 8*a* is a typical "transport category" aircraft 1 maintaining a landing descent angle as it approaches the ground 3. Deployed from the lower body of aircraft 1, are main landing gear 9. Main landing gear 9 absorbs the initial landing force as aircraft 1 comes into initial contact with the ground 3. Each of the downward pointing arrows (↓) represents the equivalent of 1 fps. As shown in FIG. 8*a* and working from left to right, the initial aircraft 1 shown has a total of twelve ↓ and represents the aircraft descending at 12 fps. Upon execution of the flare procedure the aircraft then shows a total of four ↓ and represents the aircraft's reduced vertical velocity to 4 fps as it nears initial contact with the ground 3. As aircraft 1 comes into initial contact with the ground 3, the aircraft then shows a total of two 1 and represents the aircraft's reduced vertical velocity (being the VVG), and now coming into contact with the ground at 1.8 fps. Though the aircraft 1 has come into initial contact with the ground 3, until the total weight of the aircraft 1 has become totally supported by the compressing landing gear 9, the VVG of aircraft 1 will continue to decrease until such time as the vertical velocity becomes zero, being at some point after the aircraft 1 has come into initial contact with the ground 3.

Landing events with measured VVG at 6.0 fps or less, are considered to be "within limits" landing events. If a measured landing event has a VVG in excess 6.0 fps it is identified as an "exceedance."

As aircraft 1 nears runway 3, and a flare procedure is not executed properly (as shown by the aircraft in FIG. 8*b*) a landing event of 6.1 fps or higher may occur that is not within acceptable limits. The determined threshold for exceedance limitation is subject to change to a particular airline operational preference. As an example: a respective airline may wish to lower the exceedance limit threshold to a value of 5.3 fps. Therefore Software Program Delta is designed with the ability to change the values designated for an exceedance.

2 fps is a typical VVG for most aircraft 1 landing events (see FAA landing data, FIG. 3). In today's airline operations, the VVG of aircraft 1 is not measured, thus the text of the design criteria using the word assumption. Therefore, the assumption used by aviation Regulatory Authorities must allow for a very large margin of safety. The assumption used to maintain this margin for safety for aviation Regulatory Authorities is the 10 fps assumption of a limit descent velocity.

However the strut compression is measured, either by a pressure increase or differential acceleration of landing gear components, the strut compression is measured throughout the landing event. The landing event is from just before the strut has made contact with the ground, when the wings generate lift to support the aircraft off of the ground, to the strut in contact with the ground and the wings no longer generate lift, so that the full load of the aircraft is borne by the struts. Typically, the highest descent velocity will occur upon initial contact of the strut with the ground. However, due to landing vagaries, the highest descent velocity may occur sometime after initial contact of the strut with the ground. Therefore, preferably, strut compression measurements are taken throughout the landing event so that the highest descent velocity can be found if not at the beginning of the event. As used herein, "initial contact" means the contact of interest in determining descent velocity, whether that contact is truly the first contact or a subsequent contact, such as from a bounce of the aircraft.

Figure 9:
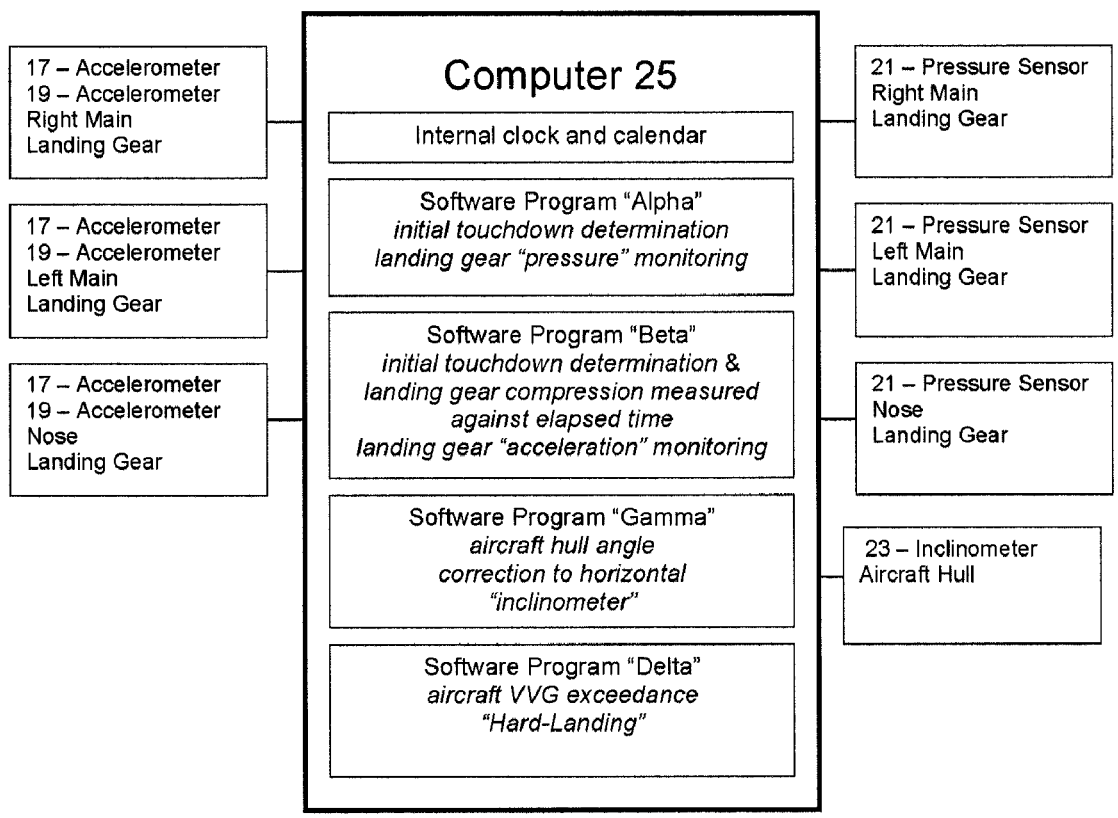
FIG. 9 is an apparatus block diagram illustrating the computer, various Software Programs, with inputs from accelerometers, pressure sensors, and inclinometer of the present invention, in accordance with a preferred embodiment.

Referring now to FIG. 9, there is shown a block diagram illustrating computer 25 being part of the apparatus of the invention, which is located within the cockpit of aircraft 1 (FIG. 1), where multiple inputs from (respective nose, left-main and right-main landing gear) "upper" accelerometers 17, "lower" accelerometers 19, and strut pressure sensors 21; all as sources of data inputs to computer 25. Aircraft hull inclinometer 23, which can be located on any horizontal portion of the aircraft 1, or located directly onto the vertical landing gear strut (see FIG. 5*a*) also has an input to computer 25. The computer 25 output determinations and information are transmitted via a series of flashing patterns to a LED diode located on the face of computer 25, which is visible to the pilot of the aircraft. Various changes of aircraft hull angle, measured by inclinometer 23 are inputs to onboard computer 25 prior to initial contact with the ground, as well as angle changes as the landing gear makes initial contact with the ground. Computer 25 is equipped with an internal clock and calendar to document the time and date of received and stored data. Computer 25 has multiple software packages which include: Software Program "Alpha"—initial touch-down determination and landing gear compression measured (strut pressure) to determine that the aircraft has come into initial contact with the ground; Software Program "Beta"—initial touch-down determination and landing gear compression measured (acceleration); Software Program "Gamma"—Aircraft Approach Angle Compensation, which uses inclinometer data to correct vertical velocity determinations at initial contact with the ground, where the aircraft hull is not horizontal and level will the ground. Software Program "Delta"—Aircraft Vertical Velocity at initial contact with the Ground "VVG", threshold and exceedance, determination of Hard Landing.

Figure 10:
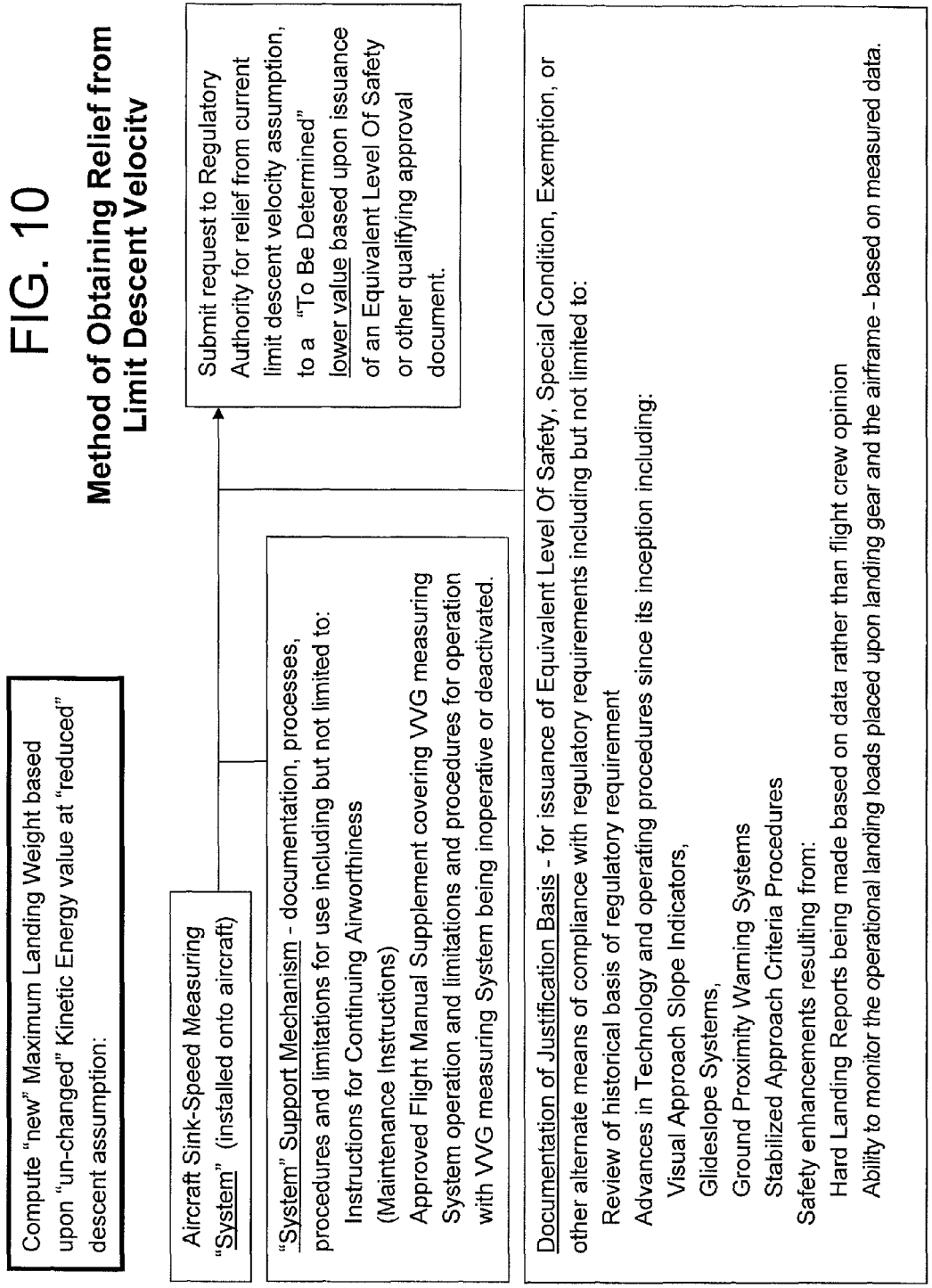
FIG. 10 is a view of a process design flow chart for a "Method of Obtaining Modification to Limit Descent Velocity Assumptions.

Referring now to FIG. 10, there is shown a process design flow chart for a Method of Obtaining Relief from Limit Descent Velocity Assumptions, from the Regulatory Authorities. Relief from limit descent velocity assumptions, from the regulatory authorities is required for the subsequent operation of the aircraft at a second higher maximum landing weight limitation. Upon the computation of a new increased Max-Landing Weight limitation, predicated on a reduction of the assumed and subsequently measured descent velocity, and the apparatus to measure and verify all subsequent landing events, "VVG"; a system support mechanism is created to document the processes, procedures and limitations for the use of the apparatus and methods of this of this invention, that Regulatory Authorities are assured an Equivalent Level Of Safety is maintained. These include, but are not limited to creating and maintaining Instructions for Continued Airworthiness, addition of an Approved Flight Manual Supplement covering this new VVG measuring system operation, limitations and procedures, as well as operational adjustments in the event the VVG System is inoperable.

There will also need to be a complete Documentation of the Justification Basis for the issuance of either, an Equivalent Level Of Safety, Special Condition, Exemption, or other alternate means of regulatory compliance. These factors include a review of the historical basis of regulatory requirement, along with advancement in technology and operating procedures since the inception of the 10 fps rule. Some of these advancements include new development of new systems and procedures that aid pilots in executing proper landings with systems such as Visual Approach Slope Indicators, Glideslope Aid Systems, Ground Proximity Warning Systems, and improved Stabilized Landing Approach Criteria and Procedures.

Safety will be increased by the subsequently implemented practice of aircraft Hard Landing Reports being made on measured data, rather than aircraft flight crew opinion. Safety will also be increase with subsequent monitoring of aircraft operational landing loads, at each respective landing gear, as opposed to waiting until a schedule maintenance cycle event, to then find minor or major damage, which would have occurred earlier.

All of these supporting materials and procedures are submitted to the Regulatory Authority as justification for the Regulatory Authority's acknowledgement and approval to allow design criteria assumptions to be reduced to a value lower than 10 fps, with this demonstration of an Equivalent Level Of Safety, or other qualifying document.

Figure 11:
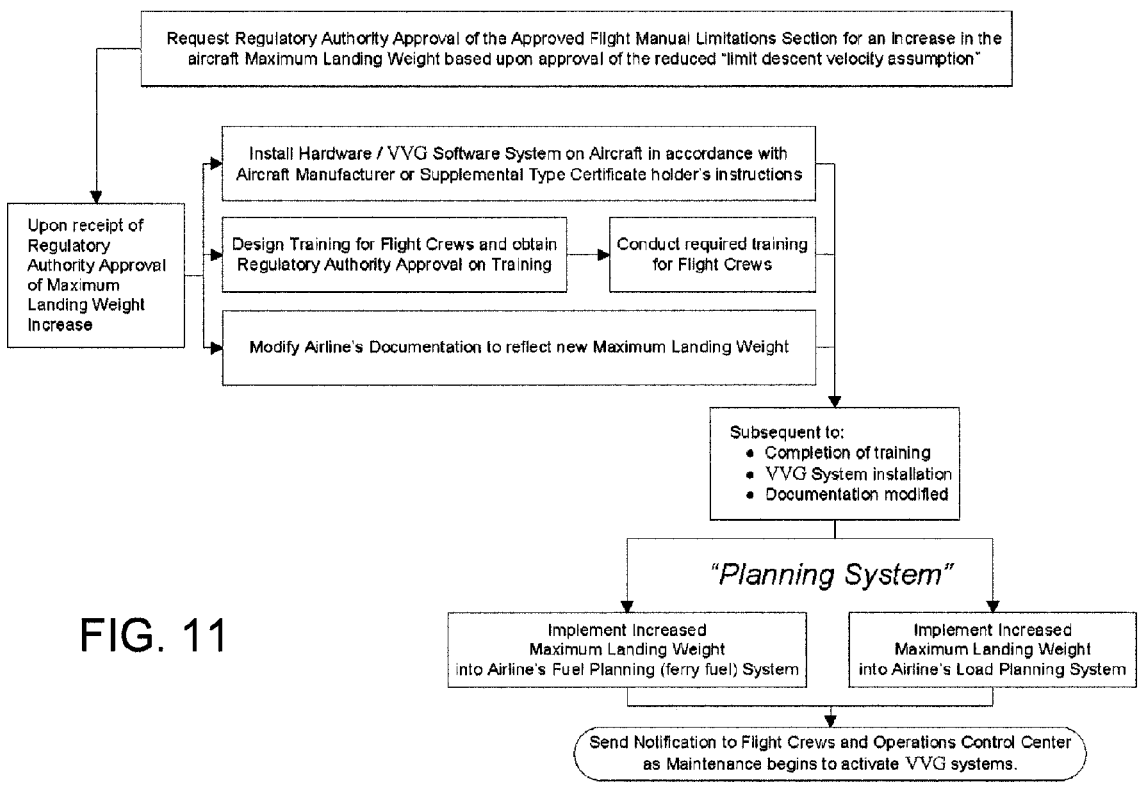
FIG. 11 is a view of a process design flow chart for a "Method of Obtaining and Implementing Increased Maximum Landing Weight" for aircraft.

Referring now to FIG. 11, there is shown a process design flow chart for a Method of Implementing Increased Maximum Landing Weight. This additional system support mechanism is created to document the processes, procedures and limitations for the use of the apparatus and methods of this of this invention, that Regulatory Authorities are assured an Equivalent Level Of Safety is maintained. Request is made of the Regulatory Authority to approve modifications to the aircraft's Approved Flight Manual Limitations section regarding the increase in aircraft MLW limitation. Upon such Flight Manual modification approval, the completion of the installation of the VVG measuring system onto the aircraft, in accordance with respective Supplemental Type Certificate installation requirements; the design of newly modified flight training programs for flight crew and implement such training programs for the use and understanding of the new VVG system is completed. The airline which operates the aircraft with the increase MLW limitation will modify its documentation for each respective aircraft equipped with the VVG measuring system. The airline can then amend their "load planning programs". When these programs and processes are complete, notification can made to flight crews and the airline's Operational Control Center, as Maintenance Control activates the VVG systems.

Figure 12:
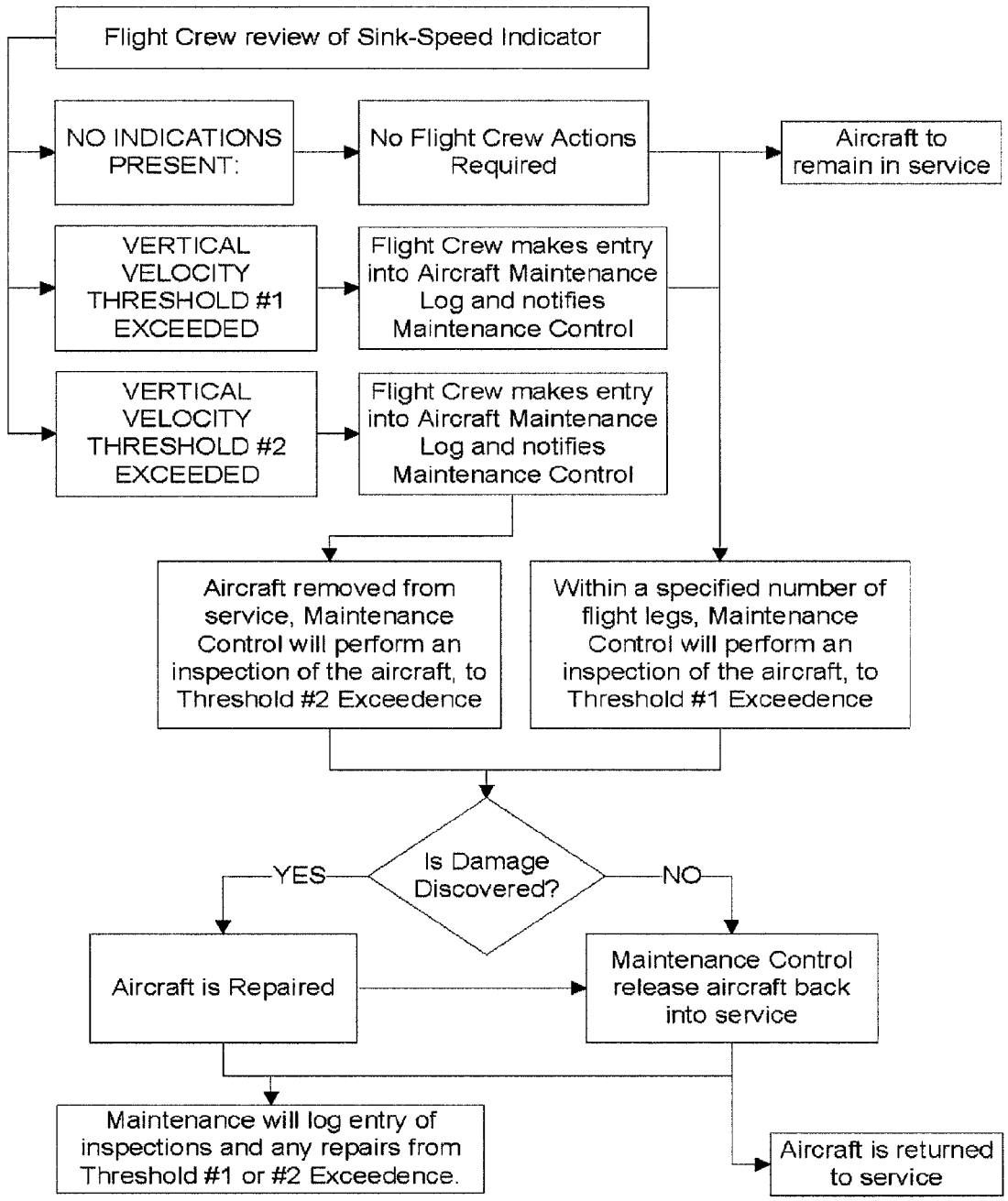
FIG. 12 is view of a process design flow chart, for required post-landing actions, to be followed by aircraft Flight Crew and Maintenance Control personnel, upon observance of measurement indications, from sink speed measuring system.

Referring now to FIG. 12, there is shown of a process design flow chart, for required post-landing actions, to be followed by aircraft Flight Crew and Maintenance Control personnel, upon observance of measurement indications, from VVG measuring System. This additional system support mechanism is created to document the processes, procedures and limitations for the use of the apparatus and methods of this of this invention, that Regulatory Authorities are assured an Equivalent Level Of Safety is maintained. In the preferred embodiment of this invention the VVG measuring system will display any aircraft VVG "Threshold" exceedance within three defined ranges. The first range of measurements will be those of less than 6 fps. If the aircraft lands at a VVG less than 6 fps, there will be no indication of a VVG Threshold #1 exceedance, but merely an indication that the system is functioning properly and accurately measuring VVG. Such case requires no flight crew actions and the aircraft may remain in service. If the aircraft lands exceeding 6 fps, but less than 8 fps a VVG Threshold #1 exceedance will be indicated. Still, to offer a "Superior Level of Safety", upon a VVG Threshold #1 exceedance, the flight crew will make a notation of the incident into the aircraft log-book and notify Maintenance Control of the Threshold #1 exceedance. The aircraft will remain in service throughout the remainder of that day, but airline Maintenance Control will perform a Threshold #1 inspection of the aircraft at the end of that day's service. This VVG identification and aircraft inspection process is not a requirement of the current aircraft regulations and implementing such a program offers a Superior Level of Safety. If no damage is found to the aircraft, the aircraft may return to service. If damage is found, the damage will be repaired and additional actions taken to lower the Threshold #1 exceedance parameters, though landing events within the 6 fps to 8 fps range should not damage the aircraft, due to original 10 fps design criteria; even though such damage was found. This added ability to lower the VVG value, that prompts the Threshold #1 inspection, will offer a Superior Level of Safety. Once the damage has been repaired, the aircraft can then be returned to service.

If the aircraft lands and VVG exceeds a predetermined value (in this example greater than 8 fps) there will be an indication of a Threshold #2 exceedance. With the occurrence of a Threshold #2 exceedance, the aircraft must be immediately removed from service. Maintenance Control will perform a more intense Threshold #2 inspection of the aircraft for damage. If no damage is found to the aircraft, the aircraft may return to service. If damage is found, the damage will be repaired and additional actions taken to lower the Threshold #2 exceedance parameters, though landing events less than 8 fps should not damage the aircraft, due to original 10 fps design criteria; even though such damage was found. This added ability will offer a Superior Level of Safety. Once the damage has been repaired, the aircraft can then be returned to service.

Thus, an aircraft can be operated at a different maximum landing weight. The aircraft has a first maximum landing weight based upon a first assumed maximum descent velocity. Vertical velocities of the aircraft at initial contact with the ground are obtained. These can be obtained by measurements from the aircraft itself, or aircraft of the same model, or from previously recorded measurements of the aircraft or aircraft of the same model. Vertical velocity data obtained from one particular aircraft or airplane can of course be used for aircraft or airplanes of the same model (such as 767). Using the vertical velocity data, the aircraft is operated at a second assumed maximum landing velocity. While so operating the aircraft, the vertical velocities of the aircraft at initial contact with the ground are measured and recorded. The aircraft is operated at a second maximum landing weight based upon the second assumed maximum descent velocity. Typically, the second maximum landing weight is greater than the first maximum landing weight. The first maximum descent velocity is typically 10 fps. The second maximum descent velocity can be less than 10 fps, such as 9.8 fps or 9.6 fps. During operation, if the measured descent velocity at initial contact with the ground exceeds a predetermined threshold, typically set at less than the second assumed maximum descent velocity, then the aircraft is inspected.

Described within this invention are methods and strategies developed; in which the whole are now greater than the sum of its parts. Each of the sub-practices of this invention are elements which build upon each other, and strengthen the foundation of justification for the realization that the aircraft design criteria regulations dating back to 1945, have worked well for decades; but the development of new technologies, procedures and the careful implementation and monitoring of such practices offer justification through a finding of an Equivalent Level Of Safety, for aviation Regulatory Authorities to allow a reduction in the original limit descent velocity assumption of 10 fps to a second lower descent velocity assumption, which is subsequently a measured vertical descent velocity; and allow the associated increase to a second higher aircraft maximum landing weight limitation.

Historically systems that measure sink-rate were used either to aid pilots in making flight-path adjustments, thereby improving the pilot's landing technique; or after landing mishaps, to better determine at what point during the landing approach, errors might have been made for adjusting the aircraft descent rates.

As opposed to using aircraft vertical descent measurements prior to the landing event, this invention uses the measurement of aircraft vertical velocity, at the initial contact with the ground; for a different function. This function being to set a determined limit, verified by mechanical measurement, for a safe but abrupt VVG, as a threshold for aircraft inspection; to justify relief in regulatory design criteria and an increase in the aircraft landing weight limitation Where previous system have been used as a tool to aid pilots with pre-landing approach procedures, to help avoid hard landing events; this new invention uses the apparatus and methods to increase the economic value of the aircraft, by bringing to better light that current regulations are too stringent; and furthermore by monitoring all subsequent landing events, and having better detection of abrupt landing events, and requiring aircraft inspection triggered by mechanical sensors as opposed to subjective pilots decisions; allows landing at an increased landing weight . . . to be at an Equivalent Level of Safety.

Although an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

The invention claimed is:

1. A method of monitoring landing gear on an aircraft at initial contact of the landing gear with the ground, each landing gear comprising a telescopic strut which is capable of extension and compression, the landing gear strut comprising a hull portion, which remains fixed to a hull of the aircraft when the landing gear is deployed for landing, and a tire portion, which is capable of moving at a different velocity, with respect to the hull portion, comprising the steps of:
 a) providing a first accelerometer on the hull of the aircraft;
 b) providing a second accelerometer on the tire portion of the strut;
 c) measuring the acceleration of the hull of the aircraft with the first accelerometer as the aircraft lands;
 d) measuring the acceleration of the tire portion of the strut with the second accelerometer as the aircraft lands;
 e) comparing the acceleration of the hull of the aircraft with the acceleration of the tire portion of the strut;
 f) determining the initial contact of the landing gear from the comparison.

2. The method of claim 1 wherein the step of providing a first accelerometer on the hull of the aircraft further comprises the step of providing the accelerometer on the hull portion of the strut.

3. The method of claim 1 further comprising the step of determining the rate of compression of the landing gear strut.

4. The method of claim 1 further comprising the step of determining the descent velocity of the strut at initial contact.

5. The method of claim 4 wherein the step of determining the descent velocity of the strut at initial contact further comprises the step of determining the descent velocity of the hull portion of the strut.

6. The method of claim 5, further comprising the steps of:
 a) determining if the descent velocity at initial contact exceeds a predetermined threshold;
 b) providing an indication if the descent velocity at initial contact exceeds the predetermined threshold.

7. The method of claim 4 wherein the step of determining the descent velocity of the strut at initial contact further comprises the step of determining the descent velocity of the tire portion of the strut.

8. The method of claim 1, further comprising the steps of
 a) measuring the pressure inside of the strut;
 b) determining from the pressure and accelerations when the initial contact of the landing gear has occurred.

9. The method of claim 8, further comprising the step of determining the descent velocity of the hull portion of the strut.

10. An apparatus for monitoring landing gear of an aircraft during initial landing gear contact with the ground, each landing gear comprising a telescopic strut with a compressible fluid, the landing gear strut comprising a hull portion which remains fixed to a hull of the aircraft when the landing gear is deployed for landing, and a tire portion, which is capable of moving at a different velocity, with respect to the hull portion, comprising:
 a) a first accelerometer mounted to the hull of the aircraft;
 b) a second accelerometer mounted to the tire portion of the strut;
 c) a processor having a first input connected to the first accelerometer and a second input connected to the second accelerometer, the processor recording the acceleration of the hull portion of the strut as measured by the first accelerometer and the acceleration of the tire portion of the strut is measured by the second accelerometer, the processor comparing the acceleration of the hull portion with the acceleration of the tire portion, the processor determining the initial contact of the landing gear from the comparison.

11. The apparatus of claim 10 wherein the first accelerometer is mounted on the hull portion of the aircraft strut.

12. The apparatus of claim 10 wherein the processor determines the descent velocity of the hull portion of the strut at initial contact.

13. The apparatus of claim 12 wherein the processor determines if the descent velocity exceeds a predetermined threshold, and if so, provides an indication that the descent velocity exceeds the predetermined threshold.

14. The apparatus of claim 10, further comprising:
 a) a pressure sensor located so as to measure the pressure inside the strut;
 b) the processor has an input that is connected to the pressure sensor, the processor determines from the pressure and the accelerations when the initial contact of the landing gear occurs.

15. The apparatus of claim 14 wherein the processor determines the descent velocity of the hull portion of the strut as compared to the acceleration of the tire portion of the strut.

16. A method of operating an aircraft, the aircraft having a first maximum landing weight based upon a first assumed maximum descent velocity, the aircraft has landing gear, each landing gear comprising a telescopic strut which is capable of extension and compression, the landing gear strut comprising a hull portion, which remains fixed to a hull of the aircraft when the landing gear is deployed for landing, and a tire portion, which is capable of moving at a different velocity with respect to the hull portion, comprising the steps of:
 a) obtaining vertical velocities of the aircraft at initial contact of the aircraft with the ground during landing events by measuring and recording the descent velocities of the aircraft at initial contact of the aircraft with the ground, comprising the steps of;
  i) providing a first accelerometer on the hull portion of the strut;
  ii) providing a second accelerometer on the tire portion of the strut;
  iii) measuring the acceleration of the hull portion with the first accelerometer as the aircraft lands;

iv) measuring the acceleration of the tire portion with the second accelerometer as the aircraft lands;
v) comparing the acceleration of the hull portion with the acceleration of the tire portion;
vi) determining the descent velocity of the hull portion of the strut, at initial contact with the ground;
b) based upon the obtained vertical velocities of the aircraft at initial contact with the ground, operating the aircraft at a second assumed maximum descent velocity while measuring and recording the vertical velocities of the aircraft at initial contact of the aircraft with the ground during landing events, the second assumed maximum descent velocity being less than the first assumed maximum descent velocity;
c) operating the aircraft at a second maximum landing weight based upon the second assumed maximum descent velocity.

17. The method of claim 16 wherein the second maximum landing weight is greater than the first maximum landing weight.

18. The method of claim 16 wherein the first assumed maximum descent velocity is 10 fps.

19. The method of claim 18 wherein the step of operating the aircraft at a second maximum descent velocity that is less than 10 fps further comprises the step of operating the aircraft at or below a second maximum descent velocity of 9.8 fps.

20. The method of claim 18 wherein the step of operating the aircraft at a second maximum descent velocity that is less than 10 fps further comprises the step of operating the aircraft at or below a second maximum descent velocity of 9.6 fps.

21. The method of claim 18 wherein the step of operating the aircraft at a second maximum descent velocity that is less than 10 fps further comprises the steps of:
a) measuring and recording the vertical velocity of the aircraft at initial contact of the aircraft with the ground during a landing event;
b) determining if the vertical velocity exceeds a predetermined threshold;
c) if the vertical velocity exceeds a predetermined threshold, then inspecting the aircraft before resuming flight operations.

22. A method of operating an aircraft, the aircraft having a maximum landing weight based upon a first assumed maximum descent velocity, the aircraft has landing gear, each landing gear comprising a telescopic strut which is capable of extension and compression, the landing gear strut comprising a hull portion, which remains fixed to a hull of the aircraft when the landing gear is deployed for landing, and a tire portion, which is capable of moving at a different velocity with respect to the hull portion, comprising the steps of:
a) measuring and recording the descent velocities of the aircraft at initial contact of the aircraft with the ground, during landing events further comprising the steps of;
  i) providing a first accelerometer on the hull portion of the strut;
  ii) providing a second accelerometer on the tire portion of the strut;
  iii) measuring the acceleration of the hull portion with the first accelerometer as the aircraft lands;
  iv) measuring the acceleration of the tire portion with the second accelerometer as the aircraft lands;
  v) comparing the acceleration of the hull portion with the acceleration of the tire portion;
  vi) determining the descent velocity of the hull portion of the strut, at initial contact with the ground;
b) determining if a measured descent velocity of the aircraft at initial contact with the ground exceeds a predetermined threshold;
c) inspecting the aircraft, upon determining if the measured descent velocity exceeds the predetermined threshold;
d) operating the aircraft at a second assumed maximum descent velocity that is less than the first assumed maximum descent velocity;
e) operating the aircraft at a second maximum landing weight that is greater than the first maximum landing weight, based upon the second assumed maximum descent velocity.

\* \* \* \* \*